United States Patent
Bossen et al.

(10) Patent No.: US 12,160,605 B2
(45) Date of Patent: Dec. 3, 2024

(54) SYSTEMS AND METHODS FOR PERFORMING INTRA PREDICTION CODING IN VIDEO CODING

(71) Applicant: Sharp Kabushiki Kaisha, Osaka (JP)

(72) Inventors: Frank Bossen, Vancouver, WA (US); Kiran Mukesh Misra, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 235 days.

(21) Appl. No.: 17/437,091

(22) PCT Filed: Mar. 11, 2020

(86) PCT No.: PCT/JP2020/010663
§ 371 (c)(1),
(2) Date: Sep. 8, 2021

(87) PCT Pub. No.: WO2020/184637
PCT Pub. Date: Sep. 17, 2020

(65) Prior Publication Data
US 2022/0167009 A1 May 26, 2022

Related U.S. Application Data

(60) Provisional application No. 62/817,454, filed on Mar. 12, 2019.

(51) Int. Cl.
*H04N 19/593* (2014.01)
*H04N 19/11* (2014.01)
(Continued)

(52) U.S. Cl.
CPC .......... *H04N 19/593* (2014.11); *H04N 19/11* (2014.11); *H04N 19/117* (2014.11);
(Continued)

(58) Field of Classification Search
CPC .... H04N 19/593; H04N 19/11; H04N 19/117; H04N 19/132; H04N 19/159;
(Continued)

(56) References Cited

U.S. PATENT DOCUMENTS

| | | | | |
|---|---|---|---|---|
| 2012/0177118 A1* | 7/2012 | Karczewicz | ......... | H04N 19/196 |
| | | | | 375/E7.243 |
| 2013/0136175 A1* | 5/2013 | Wang | ..................... | H04N 19/11 |
| | | | | 375/240.12 |

(Continued)

FOREIGN PATENT DOCUMENTS

WO 2019/154936 A1 8/2019

OTHER PUBLICATIONS

Albrecht et al., "Description of SDR, HDR, and 360° video coding technology proposal by Fraunhofer HHI", Joint Video Experts Team (JVET) of ITU-T SG 16 WP 3 and ISO/IEC JTC 1/SC 29/WG 11, JVET-J0014-v4, Apr. 10-20, 2018, 122 pages.

(Continued)

*Primary Examiner* — Rebecca A Volentine
*Assistant Examiner* — Jimmy S Lee
(74) *Attorney, Agent, or Firm* — Keating & Bennett, LLP

(57) ABSTRACT

This disclosure relates to video coding and more particularly to techniques for intra prediction coding. In one example, a method of decoding video data, the method comprising: parsing a first syntax element having a value indicating an intra sub partitions (ISP) intra prediction is used for coding a current video block; parsing a second syntax element indicating whether a most probable mode (MPM) or a non-most probable mode (MPM) is an intra prediction mode used for generating a prediction for the current video block according to the ISP intra prediction; based on whether the second syntax element indicates the MPM or the non-MPM is an intra prediction mode used for generating a prediction, (Continued)

conditionally parsing one of: a third syntax element indicating the MPM, or a fourth syntax element indicating the non-MPM; and generating a prediction for the current video block based on the first syntax element.

7 Claims, 9 Drawing Sheets

(51) Int. Cl.
*H04N 19/117* (2014.01)
*H04N 19/132* (2014.01)
*H04N 19/159* (2014.01)
*H04N 19/176* (2014.01)
*H04N 19/186* (2014.01)
*H04N 19/70* (2014.01)
*H04N 19/80* (2014.01)

(52) U.S. Cl.
CPC ......... *H04N 19/132* (2014.11); *H04N 19/159* (2014.11); *H04N 19/176* (2014.11); *H04N 19/186* (2014.11); *H04N 19/70* (2014.11); *H04N 19/80* (2014.11)

(58) Field of Classification Search
CPC .... H04N 19/176; H04N 19/186; H04N 19/70; H04N 19/80
USPC .................................... 375/240.12
See application file for complete search history.

(56) References Cited

U.S. PATENT DOCUMENTS

| | | | |
|---|---|---|---|
| 2013/0272380 A1* | 10/2013 | Chien | H04N 19/70 375/240.02 |
| 2014/0105276 A1* | 4/2014 | Nakamura | H04N 19/119 375/240.02 |
| 2014/0219342 A1* | 8/2014 | Yu | H04N 19/19 375/240.12 |
| 2018/0070110 A1* | 3/2018 | Chuang | H04N 19/134 |
| 2019/0028702 A1* | 1/2019 | Yu | H04N 19/423 |
| 2019/0116381 A1* | 4/2019 | Lee | H04N 19/426 |
| 2019/0208209 A1* | 7/2019 | Jang | H04N 19/176 |

OTHER PUBLICATIONS

Bross et al., "Versatile Video Coding (Draft 4)", Joint Video Experts Team (JVET) of ITU-T SG 16 WP 3 and ISO/IEC JTC 1/SC 29/WG 11, JVET-M1001-v6, Jan. 9-18, 2019, 298 pages.

Bross, "Versatile Video Coding (Draft 1)", Joint Video Experts Team (JVET) of ITU-T SG 16 WP 3 and ISO/IEC JTC 1/SC 29/WG 11, JVET-J1001-v2, Apr. 10-20, 2018, 43 pages.

Chen et al., "Algorithm Description of Joint Exploration Test Model 7 (JEM 7)", Joint Video Exploration Team (JVET) of ITU-T SG 16 WP 3 and ISO/IEC JTC 1/SC 29/WG 11, JVET-G1001-v1, Jul. 13-21, 2017, 50 pages.

International Telecommunication Union, "Series H: Audiovisual and Multimedia Systems Infrastructure of audiovisual services—Coding of moving video, High efficiency video coding", ITU-T H.265, Dec. 2016, 662 pages.

International Telecommunication Union, "Series H: Audiovisual and Multimedia Systems Infrastructure of audiovisual services—Coding of moving video, Advanced video coding for generic audiovisual services", ITU-T H.264, Apr. 2017, 810 pages.

Ramasubramonian et al., "CE3-related: Unification of MPM derivation for luma intra modes", Joint Video Experts Team (JVET) of ITU-T SG 16 WP 3 and ISO/IEC JTC 1/SC 29/WG 11, JVET-N0433-v3, Mar. 19-27, 2019, pp. 1-4.

* cited by examiner

SYSTEMS AND METHODS FOR PERFORMING INTRA PREDICTION CODING IN VIDEO CODING

TECHNICAL FIELD

This disclosure relates to video coding and more particularly to techniques for intra prediction coding.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10th Meeting of ISO/IEC JTC1/SC29/WG11 16-20 Apr. 2018, San Diego, CA From the multiple descriptions of video coding tools, a resulting initial draft text of a video coding specification is described in "Versatile Video Coding (Draft 1)," 10th Meeting of ISO/IEC JTC1/SC29/WG11 16-20 Apr. 2018, San Diego, CA, document JVET-J1001-v2, which is incorporated by reference herein, and referred to as JVET-J1001. The current development of the a next generation video coding standard by the VCEG and MPEG is referred to as the Versatile Video Coding (VVC) project. "Versatile Video Coding (Draft 4)," 13th Meeting of ISO/IEC JTC1/SC29/WG11 9-18 Jan. 2019, Marrakech, MA, document JVET-M1001-v6, which is incorporated by reference herein, and referred to as JVET-M1001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of decoding video data, the method comprising: parsing a first syntax element having a value indicating an intra sub partitions (ISP) intra prediction is used for coding a current video block; parsing a second syntax element indicating whether a most probable mode (MPM) or a non-most probable mode (MPM) is an intra prediction mode used for generating a prediction for the current video block according to the intra sub partitions (ISP) intra prediction; based on whether the second syntax element indicates a most probable mode (MPM) or a non-most probable mode (MPM) is an intra prediction mode used for generating a prediction, conditionally parsing one of: a third syntax element indicating a most probable mode (MPM), or a fourth syntax element indicating a non-most probable mode (MPM); and generating a prediction for the current video block based on the first syntax element.

In one example, a device for coding video data, the device comprising one or more processors configured to: parse a first syntax element having a value indicating an intra sub partitions (ISP) intra prediction is used for coding a current video block; parse a second syntax element indicating whether a most probable mode (MPM) or a non-most probable mode (MPM) is an intra prediction mode used for generating a prediction for the current video block according to the intra sub partitions (ISP) intra prediction; and based on whether the second syntax element indicates a most probable mode (MPM) or a non-most probable mode (MPM) is an intra prediction mode used for generating a prediction, conditionally parse one of: a third syntax element indicating a most probable mode (MPM), or a fourth syntax element indicating a non-most probable mode (MPM; generate a prediction for the current video block based on the ISP intra prediction.

In one example, a method of encoding video data, the method comprising: selecting an intra sub partitions (ISP) intra prediction for coding a current video block; selecting a non-most probable mode (MPM) as an intra prediction mode for generating a prediction for the current video block for the current video block according to the intra sub partitions (ISP) intra prediction; signaling a value for a first syntax element having a value indicating an intra sub partitions (ISP) intra prediction is used for coding the current video block; and signaling a value for a second syntax element indicating a non-most probable mode (MPM) is an intra prediction mode used for generating a prediction for the current video block according to the intra sub partitions (ISP) intra prediction.

DESCRIPTION OF EMBODIMENTS

Figure 1:
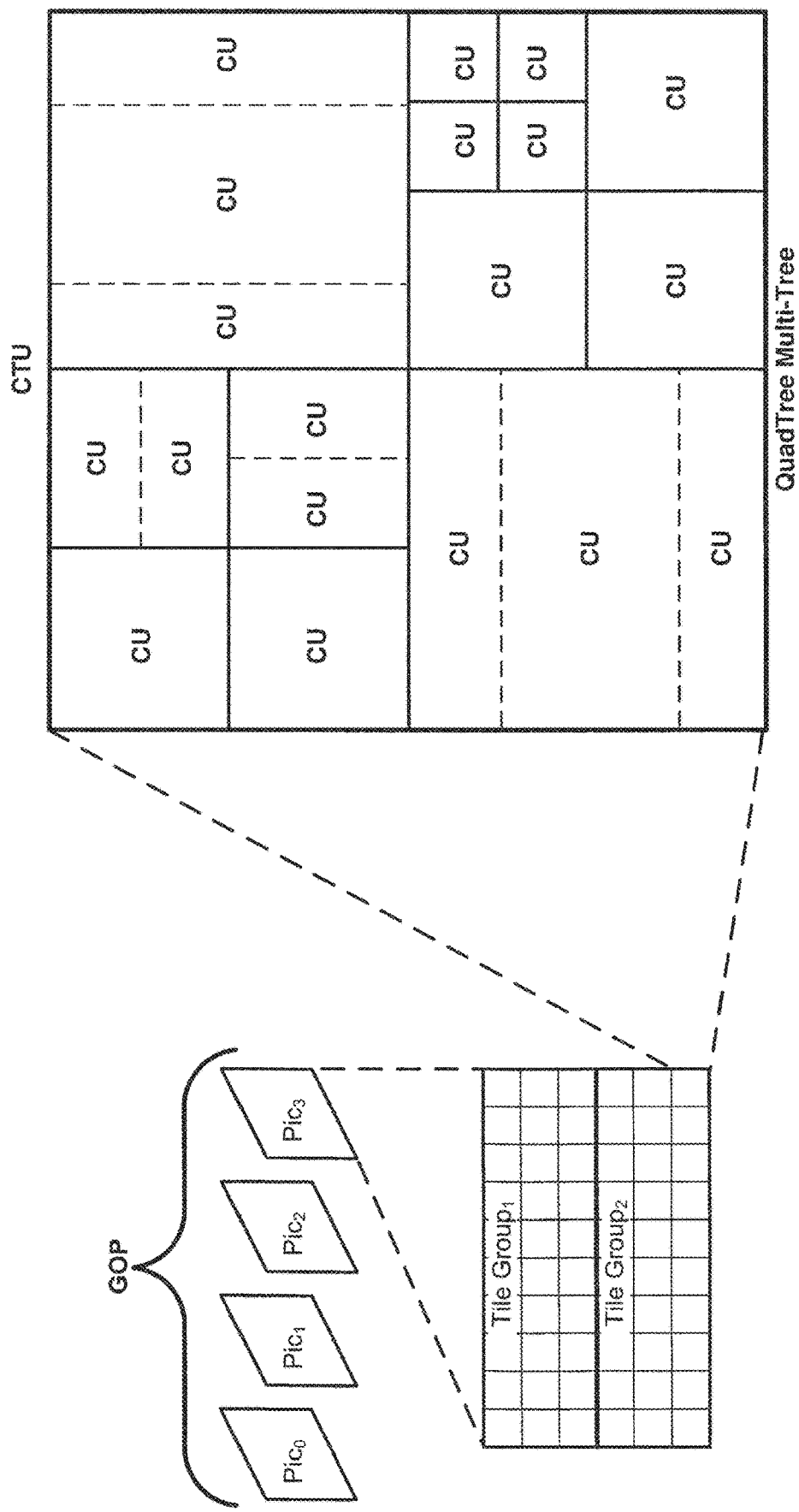
FIG. 1 is a conceptual diagram illustrating an example of a group of pictures coded according to a quad tree multi tree partitioning in accordance with one or more techniques of this disclosure.

In general, this disclosure describes various techniques for coding video data. In particular, this disclosure describes techniques for intra prediction in video coding. In particular, this disclosure describes techniques for enabling non-most probable modes for modes of intra prediction. Enabling non-most probable modes for modes of intra prediction according to the techniques described herein may be particularly useful for simplifying and harmonizing intra prediction techniques, which improve video coder performance. It should be noted that although techniques of this disclosure are described with respect to ITU-T H.264, ITU-T H.265, JEM, and JVET-M1001, the techniques of this disclosure are generally applicable to video coding. For example, the coding techniques described herein may be incorporated into video coding systems, (including video coding systems based on future video coding standards) including block structures, intra prediction techniques, inter prediction techniques, transform techniques, filtering techniques, and/or entropy coding techniques other than those included in ITU-T H.265, JEM, and JVET-M1001. Thus, reference to ITU-T H.264, ITU-T H.265, JEM, and JVET-L1001 is for descriptive purposes and should not be construed to limit the scope of the techniques described herein. Further, it should be noted that incorporation by reference of documents herein should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of encoding video data comprises selecting a non-zero reference line (NZRL) prediction or a intra sub partitions (ISP) intra prediction mode for coding a current video block; selecting a non-most probable mode (MPM) as an intra prediction mode for generating a prediction for the current video block; and signaling values of syntax elements indicating the selected NZRL prediction or ISP intra prediction mode and the selected non-MPM intra prediction mode.

In one example, a device for video coding comprises one or more processors configured to select a non-zero reference line (NZRL) prediction or a intra sub partitions (ISP) intra prediction mode for coding a current video block; select a non-most probable mode (MPM) as an intra prediction mode for generating a prediction for the current video block; and signal values of syntax elements indicating the selected NZRL prediction or ISP intra prediction mode and the selected non-MPM intra prediction mode.

In one example, a non-transitory computer-readable storage medium comprises instructions stored thereon that, when executed, cause one or more processors of a device to select a non-zero reference line (NZRL) prediction or a intra sub partitions (ISP) intra prediction mode for coding a current video block; select a non-most probable mode (MPM) as an intra prediction mode for generating a prediction for the current video block; and signal values of syntax elements indicating the selected NZRL prediction or ISP intra prediction mode and the selected non-MPM intra prediction mode.

In one example, an apparatus comprises means for selecting a non-zero reference line (NZRL) prediction or a intra sub partitions (ISP) intra prediction mode for coding a current video block; means for selecting a non-most probable mode (MPM) as an intra prediction mode for generating a prediction for the current video block; and means for signaling values of syntax elements indicating the selected NZRL prediction or ISP intra prediction mode and the selected non-MPM intra prediction mode.

In one example, a method of decoding video data comprises parsing values of syntax elements to determine a non-zero reference line (NZRL) prediction or a intra sub partitions (ISP) intra prediction mode is used for coding a current video block and to determine a non-most probable mode (MPM) as a intra prediction mode used for generating a prediction for a current video block, and generating a prediction for a current video block based on the determined NZRL prediction or ISP intra prediction mode and the determined non-MPM intra prediction mode.

In one example, a device for video coding comprises one or more processors configured to parse values of syntax elements to determine a non-zero reference line (NZRL) prediction or a intra sub partitions (ISP) intra prediction mode is used for coding a current video block and to determine a non-most probable mode (MPM) as a intra prediction mode used for generating a prediction for a current video block, and generate a prediction for a current video block based on the determined NZRL prediction or ISP intra prediction mode and the determined non-MPM intra prediction mode.

In one example, a non-transitory computer-readable storage medium comprises instructions stored thereon that, when executed, cause one or more processors of a device to parse values of syntax elements to determine a non-zero reference line (NZRL) prediction or a intra sub partitions (ISP) intra prediction mode is used for coding a current video block and to determine a non-most probable mode (MPM) as a intra prediction mode used for generating a prediction for a current video block, and generate a prediction for a current video block based on the determined NZRL prediction or ISP intra prediction mode and the determined non-MPM intra prediction mode.

In one example, an apparatus comprises means for parsing values of syntax elements to determine a non-zero reference line (NZRL) prediction or a intra sub partitions (ISP) intra prediction mode is used for coding a current video block and to determine a non-most probable mode (MPM) as a intra prediction mode used for generating a prediction for a current video block, and means for generating a prediction for a current video block based on the determined NZRL prediction or ISP intra prediction mode and the determined non-MPM intra prediction mode.

The details of one or more examples are set forth in the accompanying drawings and the description below. Other features, objects, and advantages will be apparent from the description and drawings, and from the claims.

Figure 3:
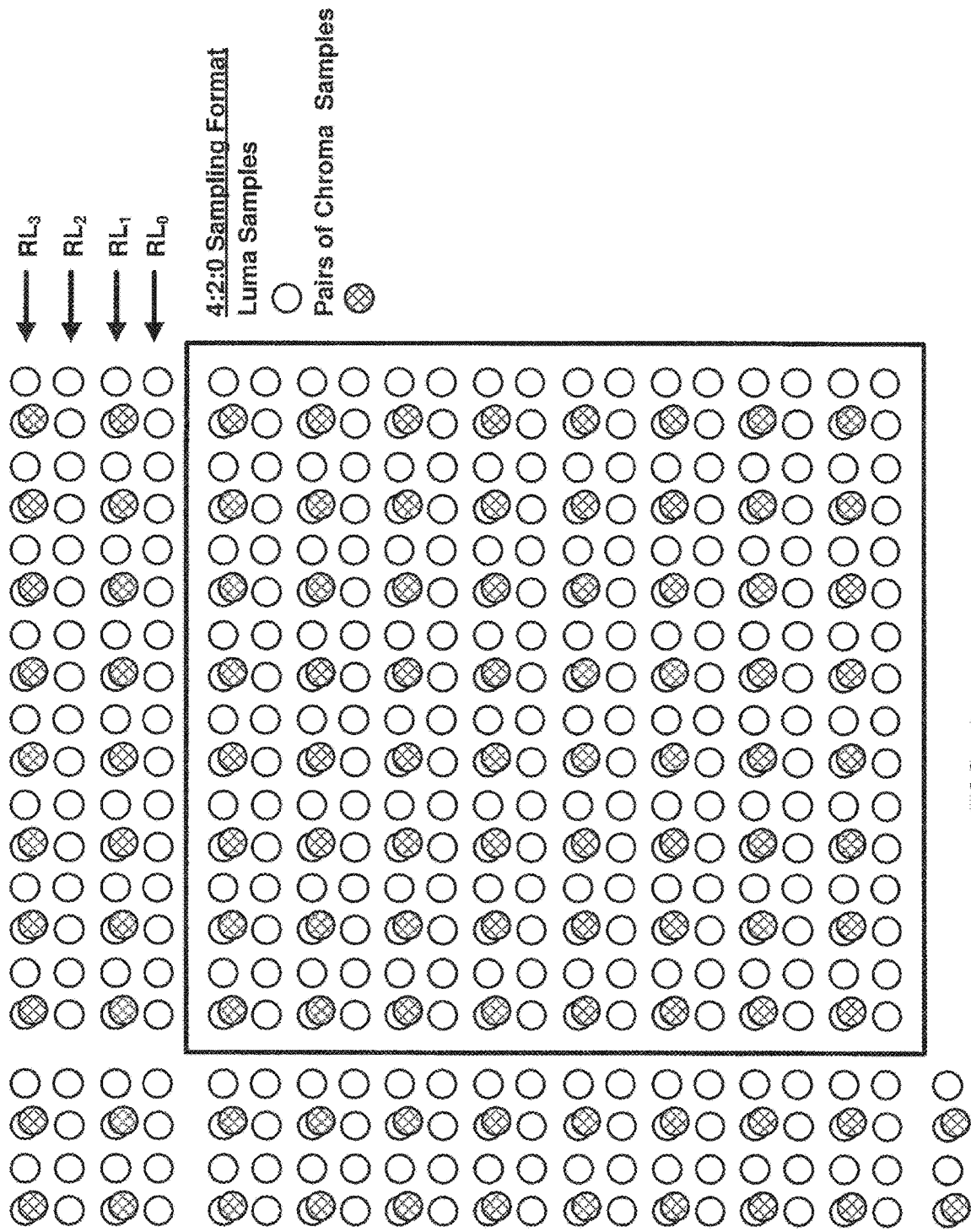
FIG. 3 is a conceptual diagram illustrating an example of a video component sampling format that may be utilized in accordance with one or more techniques of this disclosure.

Video content typically includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region (e.g., a region must be an integer number of video blocks arranged in a rectangle). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a video block formatted according to the 4:2:0 format, the width and height of an array of samples for the luma component are twice that of each array of samples for the chroma components. FIG. 3 is a conceptual diagram illustrating an example of a 16×16 coding unit formatted according to a 4:2:0 sample format. FIG. 3 illustrates the relative position of chroma samples with respect to luma samples within a video block. As described above, a video block is typically defined according to the number of horizontal and vertical luma samples. Thus, as illustrated in FIG. 3, a 16×16 video block formatted according to the 4:2:0 sample format includes 16×16 samples of luma components and 8×8 samples for each chroma component. Further, the relative position of chroma samples with respect to luma samples for video blocks neighboring the 16×16 video block are illustrated in FIG. 3. For a video block formatted according to the 4:2:2 format, the width of an array of samples for the luma component is twice that of the width of an array of samples for each chroma component, but the height of the array of samples for the luma component is equal to the height of an array of samples for each chroma component. Further, for a video block formatted according to the 4:4:4 format, an array of samples for the luma component has the same width and height as an array of samples for each chroma component. It should be noted that in JVET-M1001, generally a variable ChromaArrayType having a value of 1 indicates the 4:2:0 format; having a value of 2 indicates the 4:2:2 format; and having a value of 3 indicates the 4:4:4 format.

Video blocks may be ordered within a picture according to a scan pattern (e.g., a raster scan). A video encoder may perform predictive encoding on video blocks and subdivisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any) within the same access unit. A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice. With respect to JVET-M1001, slices are required to consist of an integer number of complete tiles instead of only being required to consist of an integer number of complete CTUs. As such, a slice including a set of CTUs which do not form a rectangular region of a picture may or may not be supported in some video coding techniques. Further, a slice that is required to consist of an integer number of complete tiles is referred to as a tile group. The techniques described herein may applicable to slices, tiles, and/or tile groups. FIG. 1 is a conceptual diagram illustrating an example of a group of pictures including tile groups. In the example illustrated in FIG. 1, $Pic_3$ is illustrated as including two tile groups (i.e., Tile $Group_1$ and Tile $Group_2$). It should be noted that in some cases, Tile $Group_1$ and Tile $Group_2$ may be classified as slices and/or tiles.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-M1001, CTUs are partitioned according a quadtree plus multi-type tree (QTMT) structure. The QTMT in JVET-M1001 is similar to the QTBT in JEM. However, in JVET-M1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree. Referring to FIG. 1, binary and ternary splits may result in non-square rectangular CUs. Further, it should be noted that in JVET-M1001, the luma channel and chroma channels may be partitioned according to a shared QTMT in some cases and separate QTMTs in some cases.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. The implementation of intra prediction coding of JVET-M1001 is described in further detail below. It should be noted that the techniques described herein may be generally applicable regardless of the number of defined possible prediction modes.

For inter prediction coding, one or more previously decoded pictures, i.e., a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., $MV_x$), a vertical displacement component of the motion vector (i.e., $MV_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B tile group), bi-prediction, uni-prediction, and intra prediction modes may be utilized, for regions having a P type (e.g., a P tile group), uni-prediction, and intra prediction modes may be utilized, and for regions having an I type (e.g., an I tile group), only intra prediction modes may be utilized. As described above, reference pictures are identified through reference indices. For example, for a P tile, there may be a single reference picture list, RefPicList0 and for a B tile, there may be a second independent reference picture list, RefPicList1, in addition to RefPicList0. It should be noted that for uni-prediction in a B tile group, one of RefPicList0 or RefPicList1 may be used to generate a prediction. Further, it should be noted that during the decoding process, at the onset of decoding a picture, reference picture list(s) are generated from previously decoded picture stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding. For a merge mode, all motion information (i.e., motion vector displacement values, reference picture indices, and reference picture lists) associated with a selected candidate is inherited as the motion information for the current video block. That is, at a video encoder, a candidate block is selected from the derived set of candidates and an index value included in the bitstream may indicate the selected candidate and thus, the motion information for the current video block. For a non-merge mode, motion vector information for a selected candidate may be used as a motion vector predictor (MVP) for the motion vector of the current video block. That is, at a video encoder, a candidate block is selected from the derived set of candidates and an index value indicating the selected candidate and a delta value (i.e., a motion vector delta (MVD)) indicating the difference between the motion vector predictor and the motion vector for the current PB may be included in the bitstream. Further, for a non-merge mode, syntax elements identifying a reference picture are included in the bitstream.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. Tt should be noted that in ITU-T H.265 and JVET-M1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed. It should be noted that in some cases which type of transform is applied to residual data may be dependent on how reference samples are generated (e.g., which type of prediction is used).

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:
+ Addition
− Subtraction
* Multiplication, including matrix multiplication
$x^y$ Exponentiation. Specifies x to the power of y. In other contexts, such notation is used for superscripting not intended for interpretation as exponentiation.
/ Integer division with truncation of the result toward zero. For example, 7/4 and −7/−4 are truncated to 1 and −7/4 and 7/−4 are truncated to Used to denote division in mathematical equations where no truncation or rounding is intended.

$$\frac{x}{y}$$

Used to denote division in mathematical equations where no truncation or rounding is intended.
x % y Modulus. Remainder of x divided by y, defined only for integers x and y with x>=0 and y>0.
Further, the following logical operators may be used:
x && y Boolean logical "and" of x and y
x | | y Boolean logical "or" of x and y
! Boolean logical "not"
x ? y: z If x is TRUE or not equal to 0, evaluates to the value of y; otherwise, evaluates to the value of z.
Further, the following relational operators may be used:
> Greater than
>= Greater than or equal to
< Less than
<= Less than or equal to
== Equal to
!= Not equal to
Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
^ Bit-wise "exclusive or". When operating on integer arguments, operates on a two's complement representation of the integer value. When operating on a binary argument that contains fewer bits than another argument, the shorter argument is extended by adding more significant bits equal to 0.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.
Further, the following assignment operators may be used:
= Assignment operator
++ Increment, i.e., x++ is equivalent to x=x+1; when used in an array index, evaluates to the value of the variable prior to the increment operation.
−− Decrement, i.e., x is equivalent to x=x−1; when used in an array index, evaluates to the value of the variable prior to the decrement operation.
+=Increment by amount specified, i.e., x+=3 is equivalent to x=x+3, and x+=(−3) is equivalent to x=x+(−3).
−=Decrement by amount specified, i.e., x=3 is equivalent to x=x−3, and x−=(−3) is equivalent to x=x−(−3).
Further, the following defined mathematical functions may be used:

$$Abs(x) = \begin{cases} x & ; \ x >= 0 \\ -x & ; \ x < 0 \end{cases}$$

$Clip1_Y(x) = Clip3(0, (1<<BitDepth_Y)-1, x)$
$Clip1_C(x) = Clip3(0, (1<<BitDepth_C)-1, x)$ $$Clip3(x, y, z) = \begin{cases} x & ; \ z < x \\ y & ; \ z > y \\ z & ; \ otherwise \end{cases}$$

Floor(x) the largest integer less than or equal to x.
Log 2(x) the base-2 logarithm of x.

$$Min(x, y) = \begin{cases} x & ; \ x <= y \\ y & ; \ x > y \end{cases}$$

$$Max(x, y) = \begin{cases} x & ; \ x >= y \\ y & ; \ x < y \end{cases}$$

Figure 2A:
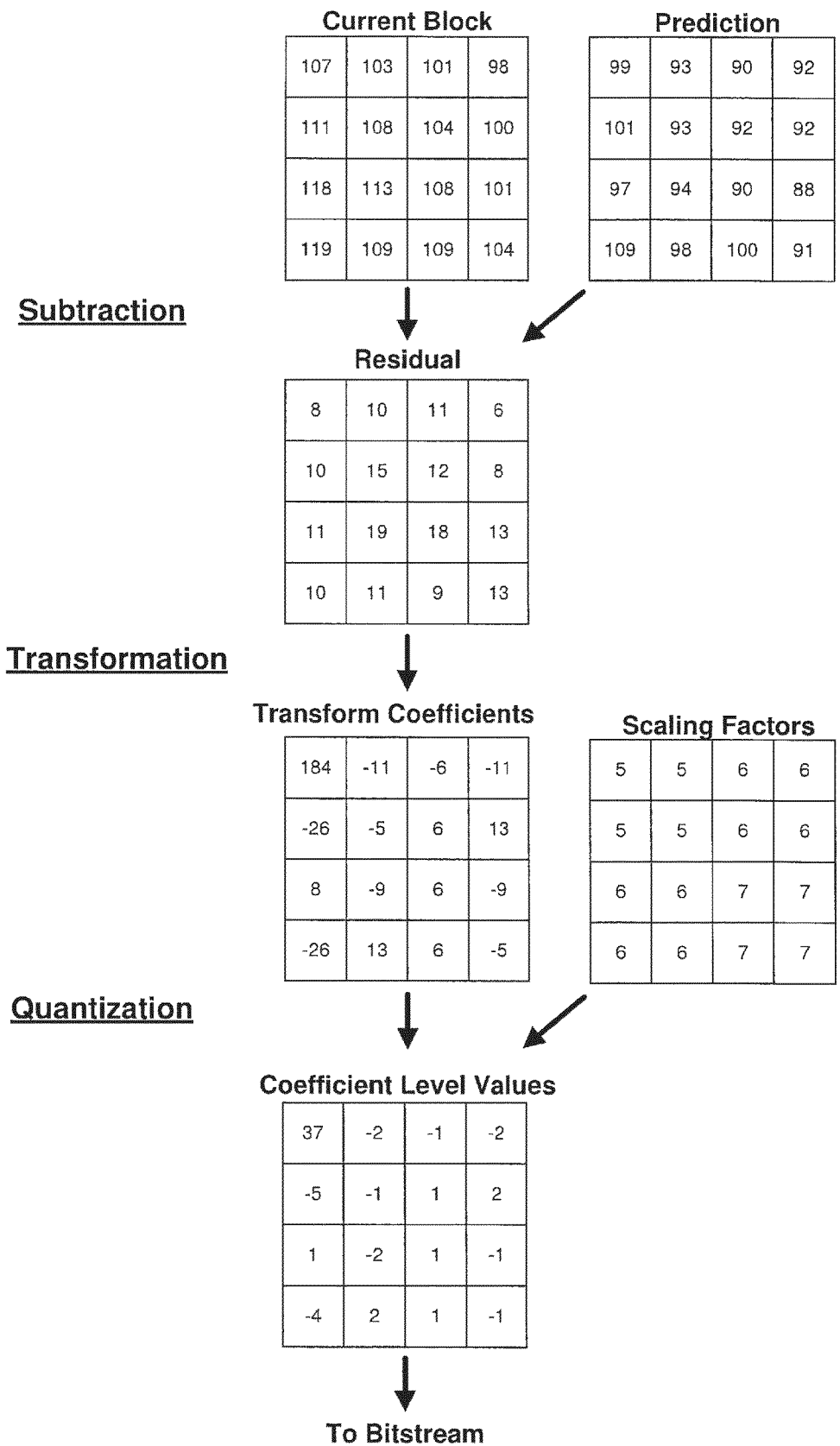
FIG. 2A is a conceptual diagram illustrating example of coding a block of video data in accordance with one or more techniques of this disclosure.
Figure 2B:
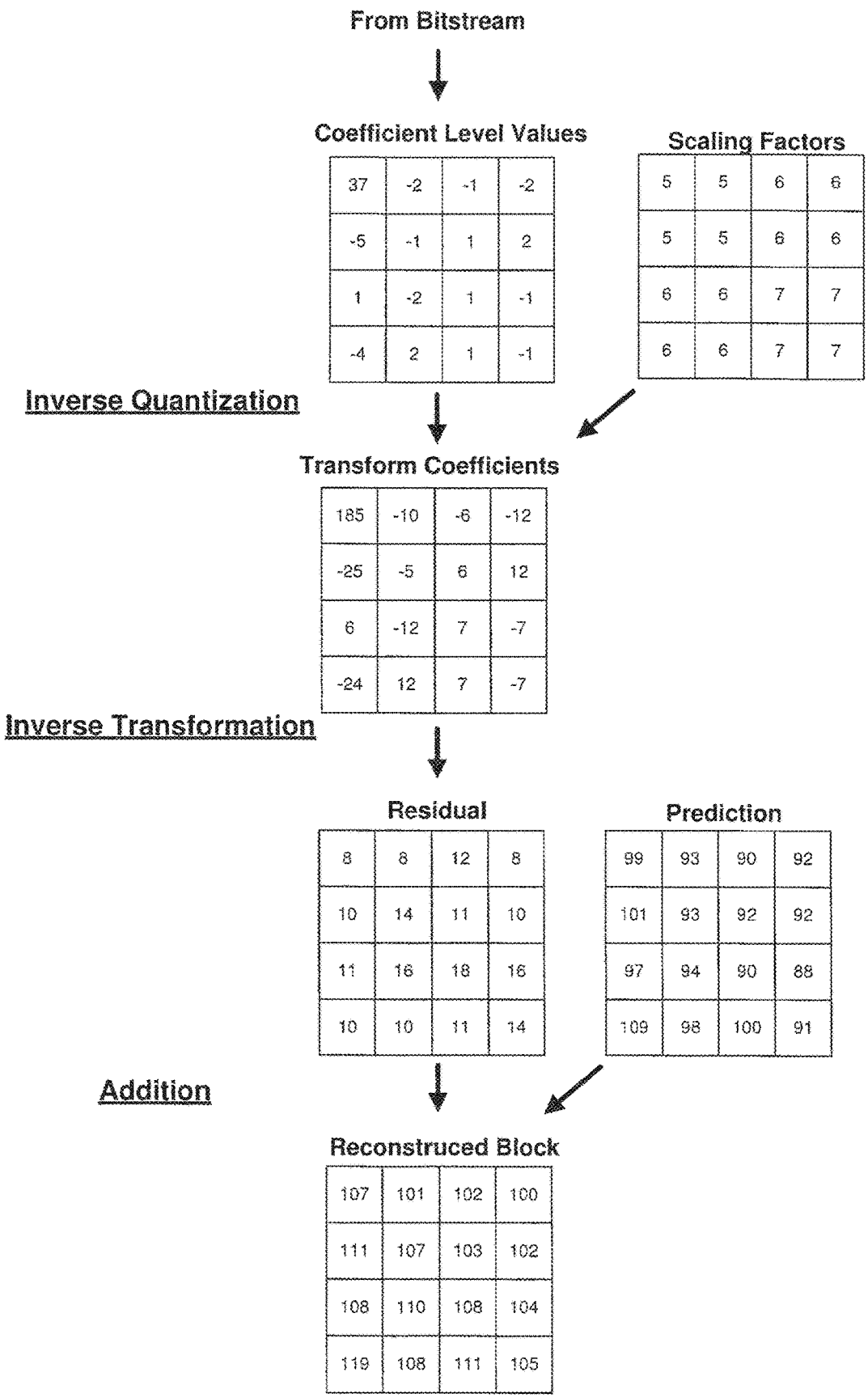
FIG. 2B is a conceptual diagram illustrating example of coding a block of video data in accordance with one or more techniques of this disclosure.

FIGS. 2A-2B are conceptual diagrams illustrating examples of coding a block of video data. As illustrated in FIG. 2A, a current block of video data (e.g., a CB corresponding to a video component) is encoded by generating a residual by subtracting a set of prediction values from the current block of video data, performing a transformation on the residual, and quantizing the transform coefficients to generate level values. The level values are coded into a bitstream. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy. However, the difference in sample values may be considered acceptable or imperceptible to a viewer of the reconstructed video.

Further, as illustrated in FIGS. 2A-2B, coefficient level values are generated using an array of scaling factors. In ITU-T H.265, an array of scaling factors is generated by selecting a scaling matrix and multiplying each entry in the scaling matrix by a quantization scaling factor. A scaling matrix may be selected based in part on a prediction mode and a color component. It should be noted that in some examples, a scaling matrix may provide the same value for each entry (i.e., all coefficients are scaled according to a single value). The value of a quantization scaling factor, may be determined by a quantization parameter, QP. Further, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). A quantization parameter may be updated for each CU and a respective quantization parameter may be derived for each of the luma and chroma channels.

As described above, intra prediction data or inter prediction data indicate how a prediction is generating for a current video block. In JVET-M1001, defined possible intra-prediction modes for luma include a planar prediction mode (predMode: 0), a DC prediction mode (predMode: 1), and 93 angular prediction modes. It should be noted that JVET-M1001 provides cross component prediction modes for chroma. Further, there may be various ways in which intra prediction modes for the chroma components may be derived based on the intra prediction mode for the luma component. An intra-prediction mode for a current video block may be signaled, in one example, by using a so-called most probable mode (MPM). Typically, in MPM signaling, an intra-prediction mode is signaled as follows: a MPM list is created (e.g., by inheriting intra-prediction modes of neighboring video blocks); an indication is provided (e.g., a flag) as to whether the intra-prediction of the current video block is a mode in the MPM list; and if the current intra mode is in the MPM list, then an index may be signaled indicating the position of the corresponding entry in the MPM list; or if the current intra mode is not in the MPM list, then syntax element(s) are signaled indicating the intramode prediction mode (which is a mode that is not in the MPM list).

It should be noted that in some cases, only a subset of the defined possible intra-prediction modes may be available for generating a prediction for a current block. For example, referring to FIG. 3, for luma samples, the line of samples immediately adjacent above the video block may be referred to as reference line $0$ ($RL_0$) and the subsequent above lines of samples may to respectively referred to as reference line $1$ ($RL_1$), reference line $2$ ($RL_2$), and reference line $3$ ($RL_3$). Similarly, columns of samples left of the current video block may be classified as references lines in a similar manner (i.e., the line of samples immediately adjacent left the video block may be referred to as reference line $0$ ($RL_0$)). In some cases, a reference line to use for intra prediction may be specified (e.g., according to a reference line index). In some cases, a subset of the defined possible intra-prediction modes may be available based on a reference line index. For example, when the reference line used for generating the intra-prediction is not the closest reference line (e.g., reference line index is not equal to 0), then only the intra modes in the MPM list may be available for generating the intra-prediction. Also, the MPM list may not be allowed to contain PLANAR and DC mode. Further, in one example, when the reference line used for generating the intra-prediction is the closest reference line (e.g., reference line index is equal to 0), then all the intra modes may be available for generating the intra-prediction and the MPM list may include PLANAR and DC modes.

In JVET-M1001 the use of reference lines other than reference line zero is referred to as non-zero reference line (NZRL) intra prediction. In JVET-M1001, NZRL intra prediction is limited to such that an intra prediction mode from the MPM list must be selected. As a result, for NZRL intra prediction, an angular mode not in the MPM list is not available for sample prediction, regardless of whether it provides the most effective coding for the current block. Further, it should be noted that JVET-M1001 does not define NZRL intra prediction for the planar prediction mode or the DC prediction mode. Thus, in JVET-M1001, NZRL intra prediction is limited to angular prediction modes included in the MPM.

Figure 4A:
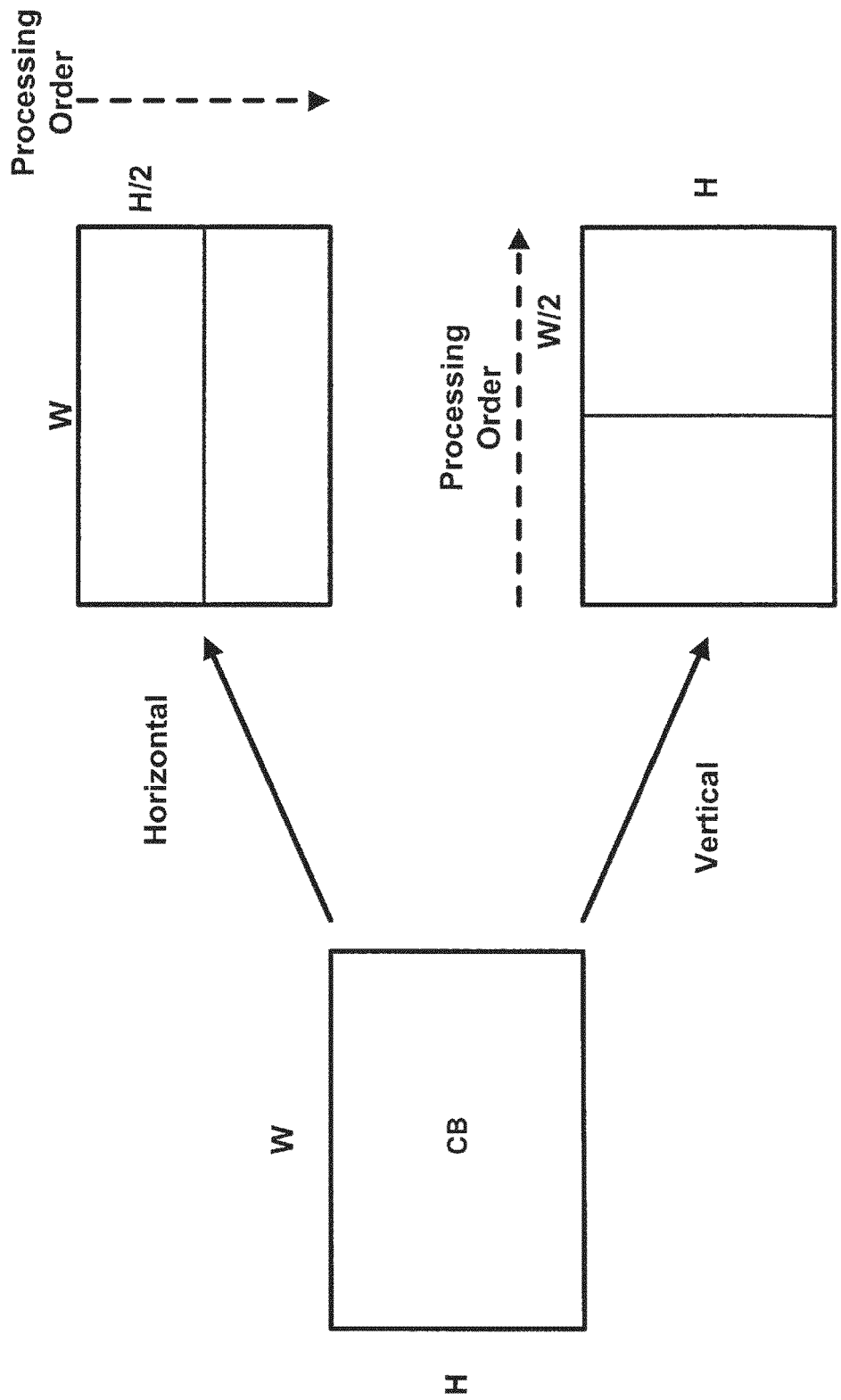
FIG. 4A is a conceptual diagram illustrating blocks of video data divided into intra sub-partitions in accordance with one or more techniques of this disclosure.
Figure 4B:
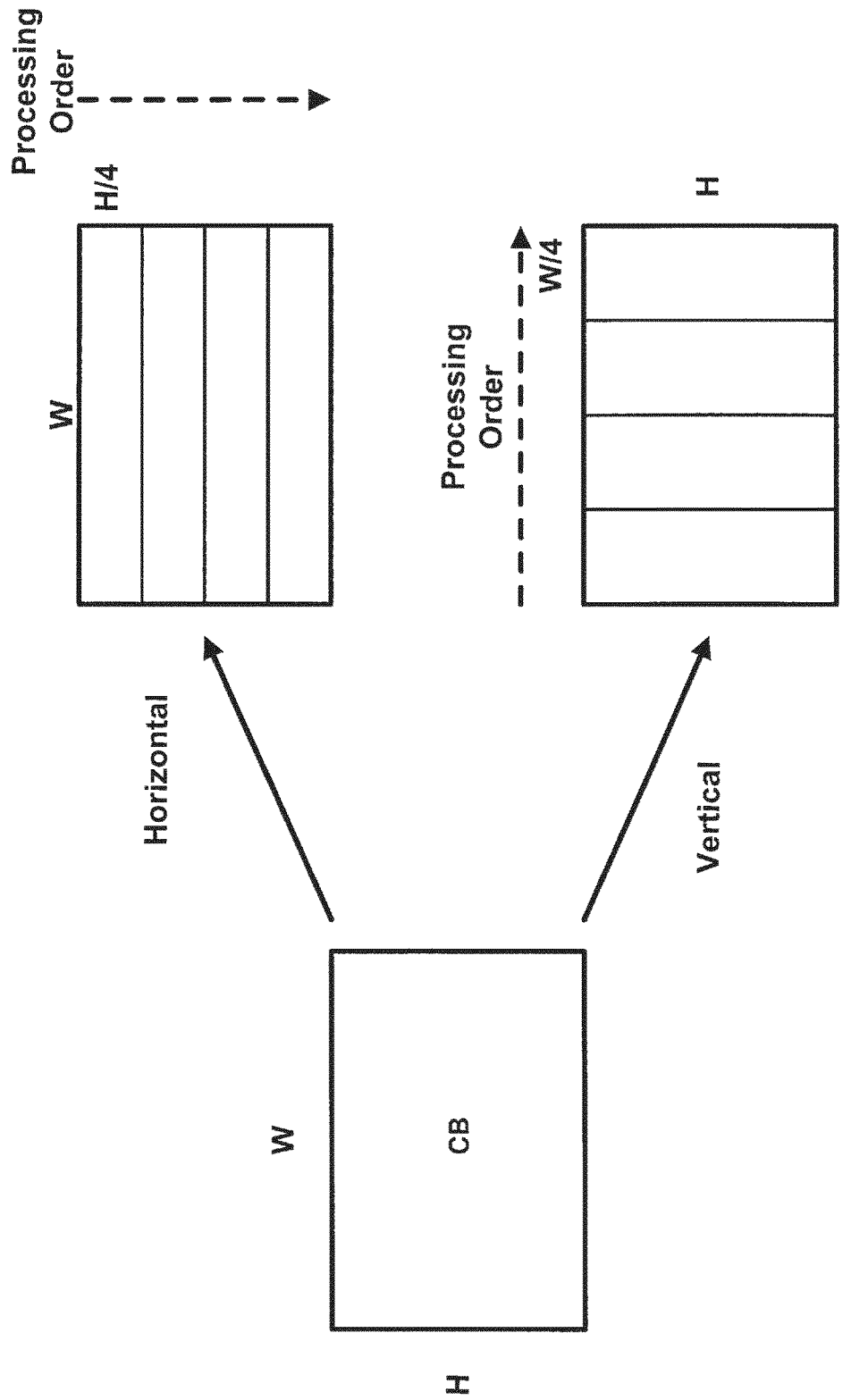
FIG. 4B is a conceptual diagram illustrating blocks of video data divided into intra sub-partitions in accordance with one or more techniques of this disclosure.

Further, in JVET-M1001, a so-called Intra Sub-Partitions (ISP) coding mode may be used for intra prediction. For the ISP coding mode in JVET-M1001, some luma intra-predicted blocks (i.e., luma CBs) are further divided vertically or horizontally into two or four sub-partitions depending on the block size dimensions. FIG. 4A illustrates an example of the division of blocks, e.g., 4×8 and 8×4 block, into two sub-partitions according to the ISP coding mode in JVET-M1001. FIG. 4B illustrates the example of the division of blocks into four sub-partitions according to the ISP coding mode in JVET-M1001. It should be noted that according to the ISP coding mode in JVET-M1001 all sub-partitions are required to fulfill the condition of having at least 16 samples. In JVET-M1001, each of the sub-partitions in the luma intra-predicted block share the same intra prediction mode. Further, FIGS. 4A-4B illustrate the processing order of the sub-partitions according to JVET-M1001. That is, as illustrated in FIGS. 4A-4B, sub-partitions generated by a horizontal division are processed from topto-bottom and sub-partitions generated by a vertical division are processed from leftto-right. It should be noted that such a processing order may be referred to as a normal processing order and a reverse processing order may refer to processing sub-partitions generated by a horizontal division from bottom-to-top and processing sub-partitions generated by a vertical division from right to left.

For each of the sub-partitions in the luma intra-predicted block, at a video encoder, a residual is generated, and at a video decoder, a reconstructed video block is generated, according to the processing order. That is, for each preceding sub-partition is reconstructed before the subsequent sub-partition. Therefore, the reconstructed values of each preceding sub-partition will be available and are used to generate the prediction of the subsequent sub-partition. That is, according to the normal processing order, reference samples used to generate sub-partition predictions are only located at the left and above a sub-partition. Further, it should be noted that each sub-partition has a corresponding residual that is independent of the residual of the other sub-partitions. That is, each sub-partition, at a video decoder, a residual is generated by inverse quantizing and performing an inverse transform on a set of level values that correspond to a sub-partition. Thus, each of the sub-partitions may be said to have a corresponding transform block and each of the sub-partition boundaries may be said to form transform block edges. Further, it should be noted that in JVET-M1001, similar to the planar prediction mode or the DC prediction mode, JVET-M1001 does not define NZRL intra prediction for ISP mode.

Table 1 illustrates the revelation portion of the coding unit syntax for intra prediction in JVET-M1001.

TABLE 1

| coding_unit( x0, y0, cbWidth, cbHeight, treeType ) { | Descriptor |
|---|---|
| if( tile_group_type != I \|\| sps_ibc_enabled_flag ) { | |
|   if( treeType != DUAL_TREE_CHROMA ) | |
|     cu_skip_flag[ x0 ][ y0 ] | ae(v) |
|   if( cu_skip_flag[ x0 ][ y0 ] == 0 && tile_group_type != I ) | |
|     pred_mode_flag | ae(v) |
|   if( ( ( tile_group_type == I && cu_skip_flag[ x0 ][ y0 ] ==0 ) \|\| ( tile_group_type != I && CuPredMode[ x0 ][ y0 ] != MODE_INTRA ) ) && sps_ibc_enabled_flag ) | |
|     pred_mode_ibc_flag | ae(v) |
| } | |
| if( CuPredMode[ x0 ][ y0 ] == MODE_INTRA ) { | |
| ... | |
| } else { | |
|   if( treeType == SINGLE_TREE \|\| treeType == DUAL_TREE_LUMA ) { | |
|     if( ( y0 % CtbSizeY ) > 0 ) | |
|       intra_luma_ref_idx[ x0 ][ y0 ] | ae(v) |
|     if (intra_luma_ref_idx[ x0 ][ y0 ] == 0 && ( cbWidth <= MaxTbSizeY \|\| cbHeight <= MaxTbSizeY ) && ( cbWidth * cbHeight > MinTbSizeY * MinTbSizeY )) | |
|       intra_subpartitions_mode_flag[ x0 ][ y0 ] | ae(v) |
|     if( intra_subpartitions_mode_flag[ x0 ][ y0 ] == 1 && cbWidth <= MaxTbSizeY && cbHeight <= MaxTbSizeY ) | |
|       intra_subpartitions_split_flag[ x0 ][ y0 ] | ae(v) |
|     if( intra_luma_ref_idx[ x0 ][ y0 ] == 0 && intra_subpartitions_mode_flag[ x0 ][ y0 ] == 0 ) | |
|       intra_luma_mpm_flag[ x0 ][ y0 ] | ae(v) |
|     if( intra_luma_mpm_flag[ x0 ][ y0 ] ) | |
|       intra_luma_mpm_idx[ x0 ][ y0 ] | ae(v) |
|     else | |
|       intra_luma_mpm_remainder[ x0 ][ y0 ] | ae(v) |
|   } | |
|   if( treeType == SINGLE_TREE \|\| treeType == DUAL_TREE_CHROMA ) | |
|     intra_chroma_pred_mode[ x0 ][ y0 ] | ae(v) |
|   } | |
| } else if( treeType != DUAL_TREE_CHROMA ) { /* MODE_INTER or MODE_IBC */ | |
| ... | |
| } | |

With respect to Table 1, for syntax elements cu_skip_flag, pred_mode_flag, pred_mode_ibc_flag, intra_luma_ref_idx, intra_subpartitions_mode_flag, intra_subpartitions_split_flag, intra_luma_mpm_flag, intra_luma_mpm_idx, intra_luma_mpm_remainder, and intra_chroma_pred_mode JVET-M1001 provides the definitions as provided above with respect to Table 1. For syntax elements, JVET-M1001 the following semantics:

cu_skip_flag[x0][y0] equal to 1 specifies that for the current coding unit, when decoding a P or B tile group, no more syntax elements except one or more of the following are parsed after cu_skip_flag[x0][y0]: the IBC mode flag pred_mode_ibc_flag [x0][y0], the merge plus MVD flag mmvd_flag[x0][y0], the merge plus MVD index mmvd_merge_flag[x0][y0], the merge plus MVD distance index mmvd distance_idx[x0][y0], the merge plus MVD direction index mmvd_direction_idx[x0][y0], the merging candidate index merge_idx[x0][y0] the subblock-based merge flag merge_subblock_flag[x0][y0], the subblock-based merging candidate index merge_subblock_idx[x0][y0], the merge triangle flag merge_triangle_flag[x0 lt y0], and the merge triangle index merge_triangle_index[x0][y0]; when decoding an I tile group, no more syntax elements except merge_idx[x0][y0] are parsed after cu_skip_flag[x0][y0]. cu_skip_flag[x0][y0] equal to 0 specifies that the coding unit is not skipped. The array indices x0, y0 specify the location (x0, y0) of the top-left luma sample of the considered coding block relative to the top-left luma sample of the picture.

When cu_skip_flag[x0][y0] is not present, it is inferred to be equal to 0.

pred_mode_flag equal to 0 specifies that the current coding unit is coded in inter prediction mode. pred_mode_flag equal to 1 specifies that the current coding unit is coded in intra prediction mode. The variable CuPredMode[x][y] is derived as follows for x=x0 . . . x0+cbWidth−1 and y=y0 . . . y0+cbHeight−1:
If pred_mode_flag is equal to 0, CuPredMode[x][y] is set equal to MODE_INTER.
Otherwise (pred_mode_flag is equal to 1), CuPredMode[x][y] is set equal to MODE_INTRA.

When pred_mode_flag is not present, it is inferred to be equal to 1 when decoding an I tile group, and equal to 0 when decoding a P or B tile group, respectively.

pred_mode_ibc_flag equal to 1 specifies that the current coding unit is coded in IBC prediction mode. pred_mode_ibc_flag equal to 0 specifies that the current coding unit is not coded in IBC prediction mode.

When pred_mode_ibc_flag is not present, it is inferred to be equal to the value of sps_ibc_enabled_flag when decoding an I tile group, and 0 when decoding a P or B tile group, respectively.

When pred_mode_ibc_flag is equal to 1, the variable CuPredMode[x][y] is set to be equal to MODE_IBC for x=x0 . . . x0+cbWidth−1 and y=y0 . . . y0+cbHeight−1.

intra_luma_ref_idx[x0][y0] specifies the intra prediction reference line index IntraLumaRefLineIdx[x][y] for x=x0 . . . x0+cbWidth−1 and y=y0 . . . y0+cbHeight−1 as specified in Table 2.

When intra_luma_ref_idx[x0][y0] is not present it is inferred to be equal to 0.

TABLE 2

| intra_luma_ref_idx[ x0 ][ y0 ] | IntraLumaRefLineIdx[ x ][ y ]<br>x = x0 . . . x0 + cbWidth − 1<br>y = y0 . . . y0 + cbHeight − 1 |
|---|---|
| 0 | 0 |
| 1 | 1 |
| 2 | 3 | intra_subpartitions_mode_flag[x0][y0] equal to 1 specifies that the current intra coding unit is partitioned into NumIntraSubPartitions[x0][y0] rectangular transform block subpartitions. intra_subpartitions_mode_flag[x0][y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_split_flag[x0][y0] specifies whether the intra subpartitions split type is horizontal or vertical. When intra_subpartitions_split_flag[x0][y0] is not present, it is inferred as follows:
If cbHeight is greater than MaxTbSizeY, intra_subpartitions_split_flag[x0][y0] is inferred to be equal to 0.
Otherwise (cbWidth is greater than MaxTbSizeY), intra_subpartitions_split_flag[x0][y0] is inferred to be equal to 1.

The variable IntraSubPartitionsSplitType specifies the type of split used for the current luma coding block as illustrated in Table 3 IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to 1+intra_subpartitions_split_flag[x0][y0].

TABLE 3

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block subpartitions an intra luma coding block is divided into. NumIntraSubPartitions is derived as follows:
If IntraSubPartitionsSplitType is equal to ISP_NO_SPLIT, NumIntraSubPartitions is set equal to 1.
Otherwise, if one of the following conditions is true, NumIntraSubPartitions is set equal to 2:
cbWidth is equal to 4 and cbHeight is equal to 8,
cbWidth is equal to 8 and cbHeight is equal to 4.
Otherwise, NumIntraSubPartitions is set equal to 4.

The syntax elements intra_luma_mpm_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit as provided below. When intra_luma_mpm_flag[x0][y0] is not present, it is inferred to be equal to 1.

intra_chroma_pred_mode[x0][y0] specifies the intra prediction mode for chroma samples. The array indices x0, y0 specify the location (x0, y0) of the top-left luma sample of the considered coding block relative to the top-left luma sample of the picture.

With respect to a process for inferring a intra prediction mode from a neighbouring intra-predicted coding unit, JVET-M1001 provides the following:
Input to this process are:
a luma location (xCb, yCb) specifying the top-left sample of the current luma coding block relative to the top-left luma sample of the current picture,
a variable cbWidth specifying the width of the current coding block in luma samples,
a variable cbHeight specifying the height of the current coding block in luma samples.
In this process, the luma intra prediction mode IntraPredModeY[xCb][yCb] is derived.
Table 3 specifies the value for the intra prediction mode IntraPredModeY[xCb][yCb] and the associated names.

TABLE 3

| Intra prediction mode | Associated name |
|---|---|
| 0 | INTRA_PLANAR |
| 1 | INTRA_DC |

TABLE 3-continued

| Intra prediction mode | Associated name |
|---|---|
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

NOTE: The intra prediction modes INTRA_LT_CCLM, INTRA_L_CCLM and INTRA_T_CCLM are only applicable to chroma components.

IntraPredModeY[xCb][yCb] is derived by the following ordered steps:
1. The neighbouring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:
The availability derivation process for a block is invoked with the location (xCurr, yCurr) set equal to (xCb, yCb) and the neighbouring location (xNbY, yNbY) set equal to (xNbX, yNbX) as inputs, and the output is assigned to availableX.
The candidate intra prediction mode candIntraPredModeX is derived as follows:
If one or more of the following conditions are true, candIntraPredModeX is set equal to INTRA_PLANAR.
The variable availableX is equal to FALSE.
CuPredMode [xNbX][yNbX] is not equal to MODE_INTRA and ciip_flag[xNbX][yNbX] is not equal to 1.
pcm_flag[xNbX][yNbX] is equal to 1.
X is equal to B and yCb−1 is less than ((yCb>>CtbLog2SizeY)<<CtbLog2SizeY).
Otherwise, candIntraPredModeX is set equal to IntraPredModeY[xNbX][yNbX].
3. The variables ispDefaultMode1 and ispDefaultMode2 are defined as follows:
If IntraSubPartitionsSplitType is equal to ISP_HOR_SPLIT, ispDefaultMode1 is set equal to INTRA_ANGULAR18 and ispDefaultMode2 is set equal to INTRA_ANGULAR5.
Otherwise, ispDefaultMode1 is set equal to INTRA_ANGULAR50 and ispDefaultMode2 is set equal to INTRA_ANGULAR63.
4. The candModeList[x] with x=0 . . . 5 is derived as follows:
If candIntraPredModeB is equal to candIntraPredModeA and candIntraPredModeA is greater than INTRA_DC, candModeList[x] with x=0 . . . 5 is derived as follows:
If IntraLumaRefLineIdx[xCb][yCb] is equal to 0 and IntraSubPartitionsSplitType is equal to ISP_NO_SPLIT, the following applies:
candModeList[0]=candIntraPredModeA
candModeList[1]=INTRA_PLANAR
candModeList[2]=INTRA_DC
candModeList[3]=2+((candIntraPredModeA+61) % 64)
candModeList[4]=2+((candIntraPredModeA−1) % 64)
candModeList[5]=2+((candIntraPredModeA+60) % 64)

Otherwise (IntraLumaRefLineIdx[xCb][yCb] is not equal to 0 or IntraSubPartitionsSplitType is not equal to ISP_NO_SPLIT), the following applies:
candModeList[0]=candIntraPredModeA
candModeList[1]=2+((candIntraPredModeA+ 61) % 64)
candModeList[2]=2+((candIntraPredModeA− 1) % 64)
If one of the following conditions is true, IntraSubPartitionsSplitType is equal to ISP_HOR_SPLIT and candIntraPredModeA is less than INTRA_ANGULAR34, IntraSubPartitionsSplitType is equal to ISP_VER_SPLIT and candIntraPredModeA is greater than or equal to INTRA_ANGULAR34, IntraLumaRefLineIdx[xCb][yCb] is not equal to 0, the following applies:
candModeList[3]=2+((candIntraPredModeA+ 60) % 64)
candModeList[4]=2+(candIntraPredModeA % 64)
candModeList[5]=2+((candIntraPredModeA+ 59) % 64)
Otherwise, the following applies:
candModeList[3]=ispDefaultMode1
candModeList[4]=ispDefaultMode2
candModeList[5]=INTRA_PLANAR
Otherwise if candIntraPredModeB is not equal to candIntraPredModeA and candIntraPredModeA or candIntraPredModeB is greater than INTRA_DC, the following applies:
The variables minAB and maxAB are derived as follows:
minAB=Min(candIntraPredModeA, candIntraPredModeB)
maxAB=Max(candIntraPredModeA, candIntraPredModeB)
If candIntraPredModeA and candIntraPredModeB are both greater than INTRA_DC, candModeList[x] with x=0 . . . 5 is derived as follows:
candModeList[0]=candIntraPredModeA
candModeList[1]=candIntraPredModeB
If IntraLumaRefLineIdx[xCb][yCb] is equal to 0 and IntraSubPartitionsSplitType is equal to ISP_NO_SPLIT, the following applies:
candModeList[2]=INTRA_PLANAR
candModeList[3]=INTRADC
If maxAB minAB is in the range of 2 to 62, inclusive, the following applies:
candModeList[4]=2+((maxAB+61) % 64)
candModeList[5]=2+((maxAB−1) % 64)
Otherwise, the following applies:
candModeList[4]=2+((maxAB+60) % 64)
candModeList[5]=2+((maxAB) % 64)
Otherwise (IntraLumaRefLineIdx[xCb][yCb] is not equal to 0 or IntraSubPartitionsSplitType is not equal to ISP_NO_SPLIT), the following applies:
When IntraSubPartitionsSplitType is not equal to ISP_NO_SPLIT, and abs(candIntraPredModeB ispDefaultMode1) is less than abs(candIntraPredModeA ispDefaultMode1), the following applies:
candModeList[0]=candIntraPredModeB
candModeList[1]=candIntraPredModeA
If maxAB minAB is equal to 1, the following applies:
candModeList[2]=2+((minAB+61) % 64)
candModeList[3]=2+((maxAB−1) % 64)
candModeList[4]=2+((minAB+60) % 64)
candModeList[5]=2+(maxAB % 64)
Otherwise if maxAB minAB is equal to 2, the following applies:
candModeList[2]=2+((minAB−1) % 64)
candModeList[3]=2+((minAB+61) 64)
candModeList[4]=2+((maxAB−1) % 64)
candModeList[5]=2+((minAB+60) % 64)
Otherwise if maxAB minAB is greater than 61, the following applies:
candModeList[2]=2+((minAB−1) % 64)
candModeList[3]=2+((maxAB+61) % 64)
candModeList[4]=2+(minAB % 64)
candModeList[5]=2+((maxAB+60) % 64)
Otherwise, the following applies:
candModeList[2]=2+((minAB+61) % 64)
candModeList[3]=2+((minAB−1) % 64)
candModeList[4]=2+((maxAB+61) % 64)
candModeList[5]=2+((maxAB−1) % 64)
Otherwise (candIntraPredModeA or candIntraPredModeB is greater than INTRA_DC), candModeList[x] with x=0 . . . 5 is derived as follows:
If IntraLumaRefLineIdx[xCb][yCb] is equal to 0 and IntraSubPartitionsSplitType is equal to ISP_NO_SPLIT, the following applies:
candModeList[0]=candIntraPredModeA
candModeList[1]=candIntraPredModeB
candModeList[2]=1 minAB
candModeList[3]=2+((maxAB+61) % 64)
candModeList[4]=2+((maxAB−1) % 64)
candModeList[5]=2+((maxAB+60) % 64)
Otherwise, if IntraLumaRefLineIdx[xCb][yCb] is not equal to 0, the following applies:
candModeList[0]=maxAB
candModeList[1]=2+((maxAB+61) % 64)
candModeList[2]=2+((maxAB−1) % 64)
candModeList[3]=2+((maxAB+60) % 64)
candModeList[4]=2+(maxAB % 64)
candModeList[5]=2+((maxAB+59) % 64)
Otherwise (IntraSubPartitionsSplitType is not equal to ISP_NO_SPLIT), the following applies:
candModeList[0]=INTRA_PLANAR
candModeList[1]=maxAB
candModeList[2]=2+((maxAB+61) % 64)
candModeList[3]=2+((maxAB−1) % 64)
candModeList[4]=2+((maxAB+60) % 64)
candModeList[5]=2+(maxAB % 64)
Otherwise, the following applies:
If IntraLumaRefLineIdx[xCb][yCb] is equal to 0 and IntraSubPartitionsSplitType is equal to ISP_NO_SPLIT, the following applies:
candModeList[0]=candIntraPredModeA
candModeList[1]= (candModeList[0]==INTRA_PLANAR) ? INTRA_DC: INTRA_PLANAR
candModeList[2]=INTRA_ANGULAR50
candModeList[3]=INTRA_ANGULAR18
candModeList[4]=INTRA_ANGULAR46
candModeList[5]=INTRA_ANGULAR54

Otherwise, if IntraLumaRefLineIdx[xCb][yCb] is not equal to 0, the following applies:
candModeList[0]=INTRA_ANGULAR50
candModeList[1]=INTRA_ANGULAR18
candModeList[2]=INTRA_ANGULAR2
candModeList[3]=INTRA_ANGULAR34
candModeList[4]=INTRA_ANGULAR66
candModeList[5]=INTRA_ANGULAR26
Otherwise, if IntraSubPartitionsSplitType is equal to ISP_HOR_SPLIT, the following applies:
candModeList[0]=INTRA_PLANAR
candModeList[1]=INTRA_ANGULAR18
candModeList[2]=INTRA_ANGULAR25
candModeList[3]=INTRA_ANGULAR10
candModeList[4]=INTRA_ANGULAR65
candModeList[5]=INTRA_ANGULAR50
Otherwise, if IntraSubPartitionsSplitType is equal to ISP_VER_SPLIT, the following applies:
candModeList[0]=INTRA_PLANAR
candModeList[1]=INTRA_ANGULAR50
candModeList[2]=INTRA_ANGULAR43
candModeList[3]=INTRA_ANGULAR60
candModeList[4]=INTRA_ANGULAR3
candModeList[5]=INTRA_ANGULAR18

5. IntraPredModeY[xCb][yCb] is derived by applying the following procedure:
   If intra_luma_mpm_flag[xCb][yCb] is equal to 1, the IntraPredModeY[xCb][yCb] is set equal to candModeList[intra_luma_mpm_idx[xCb][yCb]].
   Otherwise, IntraPredModeY[xCb][yCb] is derived by applying the following ordered steps:
   1. When candModeList[i] is greater than candModeList[j] for i=0 ... 4 and for each i, j=(i+1) ... 5, both values are swapped as follows:
      (candModeList[i], candModeList[j])=Swap (candModeList[i], candModeList[j])
   2. IntraPredModeY[xCb][yCb] is derived by the following ordered steps:
      i. IntraPredModeY[xCb][yCb] is set equal to intra_luma_mpm_remainder[xCb][yCb].
      ii. For i equal to 0 to 5, inclusive, when IntraPredModeY[xCb][yCb] is greater than or equal to candModeList[i], the value of IntraPredModeY[xCb][yCb] is incremented by one.

The variable IntraPredModeY[x][y] with x=xCb ... xCb+cbWidth−1 and y=yCb ... yCb+cbHeight−1 is set to be equal to IntraPredModeY[xCb][yCb].

With respect to intra sample prediction, JVET-M1001 provides the following with respect to generating an array of prediction samples:
Inputs to this process are:
  a sample location (xTbCmp, yTbemp) specifying the top-left sample of the current transform block relative to the top-left sample of the current picture,
  a variable predModeIntra specifying the intra prediction mode,
  a variable nTbW specifying the transform block width,
  a variable nTbH specifying the transform block height,
  a variable nCbW specifying the coding block width,
  a variable nCbH specifying the coding block height,
  a variable cIdx specifying the colour component of the current block.

Outputs of this process are the predicted samples predSamples[x][y], with x=0 ... nTbW−1, y=0 ... nTbH−1.
The variables refW and refH are derived as follows:
  If IntraSubPartitionsSplitType is equal to ISP_NO_SPLIT or cIdx is not equal to 0, the following applies:

refW=nTbW*2 refH=nTbH*2

Otherwise (IntraSubPartitionsSplitType is not equal to ISP_NO_SPLIT and cIdx is equal to 0), the following applies:

refW=nCbW*2 refH=nCbH*2

The variable refIdx specifying the intra prediction reference line index is derived as follows:
  refIdx=(cIdx==0) ? IntraLumaRefLineIdx[xTbCmp][yTbCmp]: 0
For the generation of the reference samples p[x][y] with x=−1−refIdx, y=−1−refIdx ... refH−1 and x=−refIdx ... refW−1, y=−1−refIdx, the following ordered steps apply:
  1. The reference sample availability marking process is invoked with the sample location (xTbCmp, yTbCmp), the intra prediction reference line index refIdx, the reference sample width refW, the reference sample height refH, the colour component index cIdx as inputs, and the reference samples refUnfilt[x][y] with x=−1−refIdx, y=−1−refIdx ... refH−1 and x=−refIdx ... refW−1, y=−1−refIdx as output.
  2. When at least one sample refUnfilt[x][y] with x=−1−refIdx, y=−1−refIdx ... refH−1 and x=−refIdx ... refW−1, y=−1−refIdx is marked as "not available for intra prediction", the reference sample substitution process is invoked with the intra prediction reference line index refIdx, the reference sample width refW, the reference sample height refH, the reference samples refUnfilt[x][y] with x=−1−refIdx, y=−1−refIdx ... refH−1 and x=−refIdx ... refW−1, y=−1−refIdx, and the colour component index cIdx as inputs, and the modified reference samples refUnfilt[x][y] with x=−1−refIdx, y=−1−refIdx ... refH−1 and x=−refIdx ... refW−1, y=−1−refIdx as output.
  3. The reference sample filtering process is invoked with the intra prediction reference line index refIdx, the transform block width nTbW and height nTbH, the reference sample width refW, the reference sample height refH, the unfiltered samples refUnfilt[x][y] with x=−1−refIdx, y=−1−refIdx ... refH−1 and x=−refIdx ... refW−1, y=−1−refIdx, and the colour component index cIdx as inputs, and the reference samples p[x][y] with x=−1−refIdx, y=−1−refIdx ... refH−1 and x=−refIdx ... refW−1, y=−1−refIdx as output.

The intra sample prediction process according to predModeIntra applies as follows:
  If predModeIntra is equal to INTRA_PLANAR, the corresponding intra prediction mode process specified below is invoked with the transform block width nTbW, and the transform block height nTbH, and the reference sample array p as inputs, and the output is the predicted sample array predSamples.

Otherwise, if predModeIntra is equal to INTRA_DC, the corresponding intra prediction mode process specified below is invoked with the transform block width nTbW, the transform block height nTbH, and the reference sample array p as inputs, and the output is the predicted sample array predSamples.

Otherwise, if predModeIntra is equal to INTRA_LT_CCLM, INTRA_L_CCLM or INTRA_T_CCLM, the corresponding intra prediction mode process is invoked with the intra prediction mode predModeIntra, the sample location (xTbC, yTbC) set equal to (xTbCmp, yTbCmp), the transform block width nTbW and height nTbH, and the reference sample array p as inputs, and the output is the predicted sample array predSamples.

Otherwise, the corresponding intra prediction mode process is invoked with the intra prediction mode predModeIntra, the intra prediction reference line index refIdx, the transform block width nTbW, the transform block height nTbH, the reference sample width refW, the reference sample height refH, the coding block width nCbW and height nCbH, the colour component index cIdx, and the reference sample array p as inputs, and the modified intra prediction mode predModeIntra and the predicted sample array predSamples as outputs.

When all of the following conditions are true, the position-dependent prediction sample filtering process specified below is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:

IntraSubPartitionsSplitType is equal to ISP_NO_SPLIT or cIdx is not equal to 0 refIdx is equal to 0 or cIdx is not equal to 0

One of the following conditions is true:
predModeIntra is equal to INTRA_PLANAR
predModeIntra is equal to INTRA_DC
predModeIntra is equal to INTRA_ANGULAR18
predModeIntra is equal to INTRA_ANGULAR50
predModeIntra is less than or equal to INTRA_ANGULAR10
predModeIntra is greater than or equal to INTRA_ANGULAR58

JVET-M1001 provides the following specification of the INTRA_PLANAR intra prediction mode:
Inputs to this process are:
a variable nTbW specifying the transform block width,
a variable nTbH specifying the transform block height,
the neighbouring samples p[x][y], with x=−1, y=−1 . . . nTbH and x=0 . . . nTbW, y=−1.

Outputs of this process are the predicted samples predSamples[x][y], with x=0 . . . nTbW−1, y=0 . . . nTbH−1.

The variables nW and nH are derived as follows:
nW=Max(nTbW, 2)
nH=Max(nTbH, 2)

The values of the prediction samples predSamples[x][y], with x=0 . . . nTbW−1 and y=0 . . . nTbH−1, are derived as follows:

$$predV[x][y]=((nH-1-y)*p[x][-1]+(y+1)*p[-1][nTbH])<<\text{Log } 2(nW)$$

$$predH[x][y]=((nW-1-x)*p[-1][y]+(x+1)*p[nTbW][-1])<<\text{Log } 2(nH)$$

$$predSamples[x][y]=(predV[x][y]+predH[x][y]+nW*nH)>>(\text{Log } 2(nW)+\text{Log } 2(nH)+1)$$

JVET-M1001 provides the following specification of the INTRA_DC intra prediction mode:
Inputs to this process are:
a variable nTbW specifying the transform block width,
a variable nTbH specifying the transform block height,
the neighbouring samples p[x][y], with x=−1, y=−1 . . . nTbH−1 and x=0 . . . nTbW−1, y=−1.

Outputs of this process are the predicted samples predSamples[x][y], with x=0 . . . nTbW−1, y=0 . . . nTbH−1.

The values of the prediction samples predSamples[x][y], with x=0 . . . nTbW−1, y=0 . . . nTbH−1, are derived by the following ordered steps:
1. A variable dcVal is derived as follows:
When nTbW is equal to nTbH:

$$dcVal=(\Sigma_{x'=0}^{nTbW-1}p[x'][-1]+\Sigma_{y'=0}^{nTbH-1}p[-1][y']+nTbW)>>(\text{Log } 2(nTbW)+1)$$

When nTbW is greater than nTbH:

$$dcVal=(\Sigma_{x'=0}^{nTW-2}p[x'][-1]+(nTbW>>1))>>\text{Log } 2(nTbW)$$

When nTbW is less than nTbH:

$$dcVal=(\Sigma_{y'=0}^{nTbW-1}p[-1]+(nTbH>>1))>>\text{Log } 2(nTbH)$$

2. The prediction samples predSamples[x][y] are derived as follows: predSamples[x][y]=dcVal, with x=0 . . . nTbW−1, y=0 . . . nTbH−1

JVET-M1001 further provides where a position-dependent intra prediction sample filtering process for modifying predicted samples is conditionally invoked as follows:

When all of the following conditions are true, the position-dependent prediction sample filtering process specified below is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:

IntraSubPartitionsSplitType is equal to ISP_NO_SPLIT or cIdx is not equal to 0
refIdx is equal to 0 or cIdx is not equal to 0
One of the following conditions is true:
predModeIntra is equal to INTRA_PLANAR
predModeIntra is equal to INTRA_DC
predModeIntra is equal to INTRA_ANGULAR18
predModeIntra is equal to INTRA_ANGULAR50
predModeIntra is less than or equal to INTRA_ANGULAR10
predModeIntra is greater than or equal to INTRA_ANGULAR58

Position-dependent intra prediction sample filtering process

Inputs to this process are:
the intra prediction mode predModeIntra,
a variable nTbW specifying the transform block width,
a variable nTbH specifying the transform block height,
a variable refW specifying the reference samples width,
a variable refH specifying the reference samples height,
the predicted samples predSamples[x][y], with x=0 . . . nTbW−1, y=0 . . . nTbH−1,
the neighbouring samples p[x][y], with x=−1, y=−1 . . . refH−1 and x=0 . . . refW−1, y=−1,
a variable cIdx specifying the colour component of the current block.

Outputs of this process are the modified predicted samples predSamples[x][y] with x=0 . . . nTbW−1, y=0 . . . nTbH−1.

Depending on the value of cIdx, the function clip1Cmp is set as follows:
If cIdx is equal to 0, clip1Cmp is set equal to Clip1y.
Otherwise, clip1Cmp is set equal to Clip1c.

The variable nScale is set to ((Log 2(nTbW)+Log 2(nTbH) 2)>>2).

The reference sample arrays mainRef[x] and sideRef[y], with x=0 . . . refW−1 and y=0 . . . refH−1 are derived as follows:
mainRef[x]=p[x][−1]
sideRef[y]=p[−1][y]

The variables refL[x][y], refT[x][y], wT[y], wL[x] and wTL[x][y] with x=0 . . . nTbW−1, y=0 . . . nTbH−1 are derived as follows:

If predModeIntra is equal to INTRA_PLANAR or INTRA_DC, the following applies:
refL[x][y]=p[−1][y]
refT[x][y]=p[x][−1]
wT[y]=32>>((y<<1)>>nScale)
wL[x]=32>>((x<<1)>>nScale)
wTL[x][y]=(predModeIntra==INTRA_DC) ? ((wL[x]>>4)+(wT[y]>>4)):0

Otherwise, if predModeIntra is equal to INTRA_ANGULAR18 or INTRA_ANGULAR50, the following applies:
refL[x][y]=p[−1][y]
refT[x][y]=p[x][−1]
wT[y]=(predModeIntra==INTRA_ANGULAR18) ? 32>>((y<<1)>>nScale): 0
wL[x]=(predModeIntra==INTRA_ANGULAR50) ? 32>>((x<<1)>>nScale): 0
wTL[x][y]=
(predModeIntra==INTRA_ANGULAR18) ? wT[y]: wL[x]

Otherwise, if predModeIntra is equal to INTRA_ANGULAR2 or INTRA_ANGULAR66, the following applies:
refL[x][y]=p[−1][x+y+1]
refT[x][y]=p[x+y+1][−1]
wT[y]=(32>>1)>>((y<<1)>>nScale)
wL[x]=(32>>1)>>((x<<1)>>nScale)
wTL[x][y]=0

Otherwise, if predModeIntra is less than or equal to INTRA_ANGULAR10, the following ordered steps apply:
1. The variables dXPos[y], dXFrad[y], dXInt[y] and dX[x][y] are derived as follows using invAngle depending on intraPredMode:
dXPos[y]=((y+1)*invAngle+2)>>2
dXFrac[y]=dXPos[y]& 63
dXInt[y]=dXPos [y]>>6
dX[x][y]=x+dXInt[y]
2. The variables refL[x][y], refT[x][y], wT[y], wL[x] and wTL[x][y] are derived as follows:
refL[x][y]=0
refT[x][y]=(dX[x][y]<refW−1) ? mainRef[dX[x][y]+(dXFrac[y]>>5)]: 0
wT[y]=(dX[x][y]<refW−1) ? 32>> ((y<<1)>>nScale): 0
wL[x]=0
wTL[x][y]=0

Otherwise, if predModeIntra is greater than or equal to INTRA_ANGULAR58, the following ordered steps apply:
1. The variables dYPos[x], dYFrac[x], dYInt[x] and dY[x][y] are derived as follows using invAngle depending on intraPredMode:
dYPos[x]=((x+1)*invAngle+2)>>2
dYFrac[x]=dYPos[x]& 63
dYInt[x]=dYPos[x]>>6
dY[x][y]=y+dYInt[x]
2. The variables refL[x][y], refT[x][y], wT[y], wL[x] and wTL[x][y] are derived as follows:
refL[x][y]=(dY[x][y]<refH−1) ? sideRef[dY[x][y]+(dYFrac[x]>>5)]: 0
refT[x][y]=0
wT[y]=0
wL[x]=(dY[x][y]<refH−1) ? 32>> ((x<<1)>>nScale): 0
wTL[x][y]=0

Otherwise, refL[x][y], refT [x][y], wT[y], wL [x] and wTL[x][y] are all set equal to 0.

The values of the modified predicted samples predSamples[x][y] with x=0 . . . nTbW−1, y=0 . . . nTbH−1 are derived as follows:
predSamples[x][y]=
clip1Cmp((refL[x][y] *wL[x]+refT[x][y]*wT[y]−p[−1][−1]*wTL[x][y]+(64−wL[x]−wT[y]+wTL[x][y])*predSamples[x][y]+32)>>6)

As described above, JVET-M1001 does not allow non-MPM modes for NZRL and ISP intra prediction. In particular, referring to Table 1, according to the condition:
if (intra_luma_ref_idx[x0][y0]==0 && intra_subpartitions_mode_flag[x0][y0]==0)
intra_luma_mpna_flag[x0][y0] is not present and inferred to be equal to 1 and thus,
intra_luma_mpm_idx and not intra_luma_mpm_remainder is used for specifying a
intra prediction mode for NZRL and ISP intra prediction.

According to the techniques herein non-MPM intra prediction modes may be enabled for NZRL and/or ISP prediction modes. Enabling non-MPM intra prediction modes for NZRL and/or ISP prediction modes results in: (i) more consistent signaling, (ii) a reduction in the number of checks compared to the current signaling in the JVET-M1001 and (iii) flexibility in the design of future encoders. Further, it should be noted that according to the techniques herein, coding processes which are dependent on an intra mode prediction are modified to handle cases where non-MPM intra prediction modes are enabled for NZRL and/or ISP prediction modes, which may results in additional coding improvements.

As described above, in some cases, which type of transform is applied to residual data may be dependent on how reference samples are generated. In particular, in JVET-M1001, according to the following transform process, a type of transform may be dependent on an intra prediction mode:

Inputs to this process are:
  a luma location (xTbY, yTbY) specifying the top-left sample of the current luma transform block relative to the top-left luma sample of the current picture,
  a variable nTbW specifying the width of the current transform block,
  a variable nTbH specifying the height of the current transform block,
  a variable cIdx specifying the colour component of the current block,
  an (nTbW)x(nTbH) array d[x][y] of scaled transform coefficients with x=0 . . . nTbW−1, y=0 . . . nTbH−1.
Output of this process is the (nTbW)x(nTbH) array r[x][y] of residual samples with x=0 . . . nTbW−1, y=0 . . . nTbH−1.
The variable implicitMtsEnabled is derived as follows:
  If sps_mts_enabled_flag is equal to 1 and one of the following conditions is true, implicitMtsEnabled is set equal to 1:
    IntraSubPartitionsSplitType is not equal to ISP_NO_SPLIT
    cu_sbt_flag is equal to 1 and Max(nTbW, nTbH) is less than or equal to 32
    sps_explicit_mts_intra_enabled_flag and sps_explicit_mts_inter_enabled_flag are both equal to 0 and CuPredMode [xTbY][yTbY] is equal to MODE_INTRA
  Otherwise, implicitMtsEnabled is set equal to 0.
The variable trTypeHor specifying the horizontal transform kernel and the variable trTypeVer specifying the vertical transform kernel are derived as follows:
  If cIdx is greater than 0, trTypeHor and trTypeVer are set equal to 0.
  Otherwise, if implicitMtsEnabled is equal to 1, the following applies:
    If IntraSubPartitionsSplitType is not equal to ISP_NO_SPLIT, trTypeHor and trTypeVer are specified in Table 6 depending on intraPredMode.
    Otherwise, if cu_sbt_flag is equal to 1, trTypeHor and trTypeVer are specified in Table 5 depending on cu_sbt_horizontal_flag and cu_sbt_pos_flag.
    Otherwise (sps_explicit_mts_intra_enabled_flag and sps_explicit_mts_inter_enabled_flag are equal to 0), trTypeHor and trTypeVer are derived as follows:
      trTypeHor=(nTbW>=4 && nTbW<=16 && nTbW<=nTbH) ? 1:0
      trTypeVer=(nTbH>=4 && nTbH<=16 && nTbH<=nTbW) ? 1:0
  Otherwise, trTypeHor and trTypeVer are specified in Table 4 depending on tu_mts_idx[xTbY][yTbY].
The variables nonZeroW and nonZeroH are derived as follows:
  nonZeroW=Min(nTbW, (trTypeHor>0) ? 16:32)
  nonZeroH=Min(nTbH, (trTypeVer>0) ? 16:32)
The (nTbW)x(nTbH) array r of residual samples is derived as follows:
  1. When nTbH is greater than 1, each (vertical) column of scaled transform coefficients d[x][y] with x=0 . . . nonZeroW−1, y=0 . . . nonZeroH−1 is transformed to e[x][y] with x=0 . . . nonZeroW−1, y=0 . . . nTbH−1 by invoking the one-dimensional transformation process for each column x=0 . . . nonZeroW−1 with the height of the transform block nTbH, the non-zero height of the scaled transform coefficients nonZeroH, the list d[x][y] with y=0 . . . nonZeroH−1 and the transform type variable trType set equal to trTypeVer as inputs, and the output is the list e[x][y] with y=0 . . . nTbH−1.
  2. When nTbH and nTbW are both greater than 1, the intermediate sample values g[x][y] with x=0 . . . nonZeroW−1, y=0 . . . nTbH−1 are derived as follows:

g[x][y]=Clip3(CoeffMin,CoeffMax, (e[x][y]+64)>>7)

3. When nTbW is greater than 1, each (horizontal) row of the resulting array g[x][y] with x=0 . . . nonZeroW−1, y=0 . . . nTbH−1 is transformed to r[x][y] with x=0 . . . nTbW−1, y=0 . . . nTbH−1 by invoking the one-dimensional transformation process for each row y=0 . . . nTbH−1 with the width of the transform block nTbW, the non-zero width of the resulting array g[x][y] nonZeroW, the list g[x][y] with x=0 . . . nonZeroW−1 and the transform type variable trType set equal to trTypeHor as inputs, and the output is the list r[x][y] with x=0 . . . nTbW−1.

TABLE 4

| tu_mts_idx[ x0 ][ y0 ] | 0 | 1 | 2 | 3 | 4 |
|---|---|---|---|---|---|
| trTypeHor | 0 | 1 | 2 | 1 | 2 |
| trTypeVer | 0 | 1 | 1 | 2 | 2 |

TABLE 5

| cu_sbt_horizontal_flag | cu_sbt_pos_flag | trTypeHor | trTypeVer |
|---|---|---|---|
| 0 | 0 | 2 | 1 |
| 0 | 1 | 1 | 1 |
| 1 | 0 | 1 | 2 |
| 1 | 1 | 1 | 1 |

TABLE 6

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_ANGULAR33, INTRA_ANGULAR35 | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | 0 | ( nTbH >= 4 && nTbH <= 16 ) ? 1 : 0 |

Further, as described above, in CABAC, a context may be determined for bins in the current syntax element. In particular, JVET-M1001 provides that for each bin of a syntax element a context index value, ctxInc, corresponding to a context is specified according to an entry in a table, where an entry provides a value or an assignment process. Table 7 illustrates the ctxInc entry for syntax element intra_luma_mpm_flag, which as illustrated in Table 7 includes provides a value for ctxInc that independent of value of previously coded bins.

TABLE 7

| Syntax element | binIdx 0 |
|---|---|
| intra_luma_mpm_flag[ ][ ] | 0 |

Figure 5:
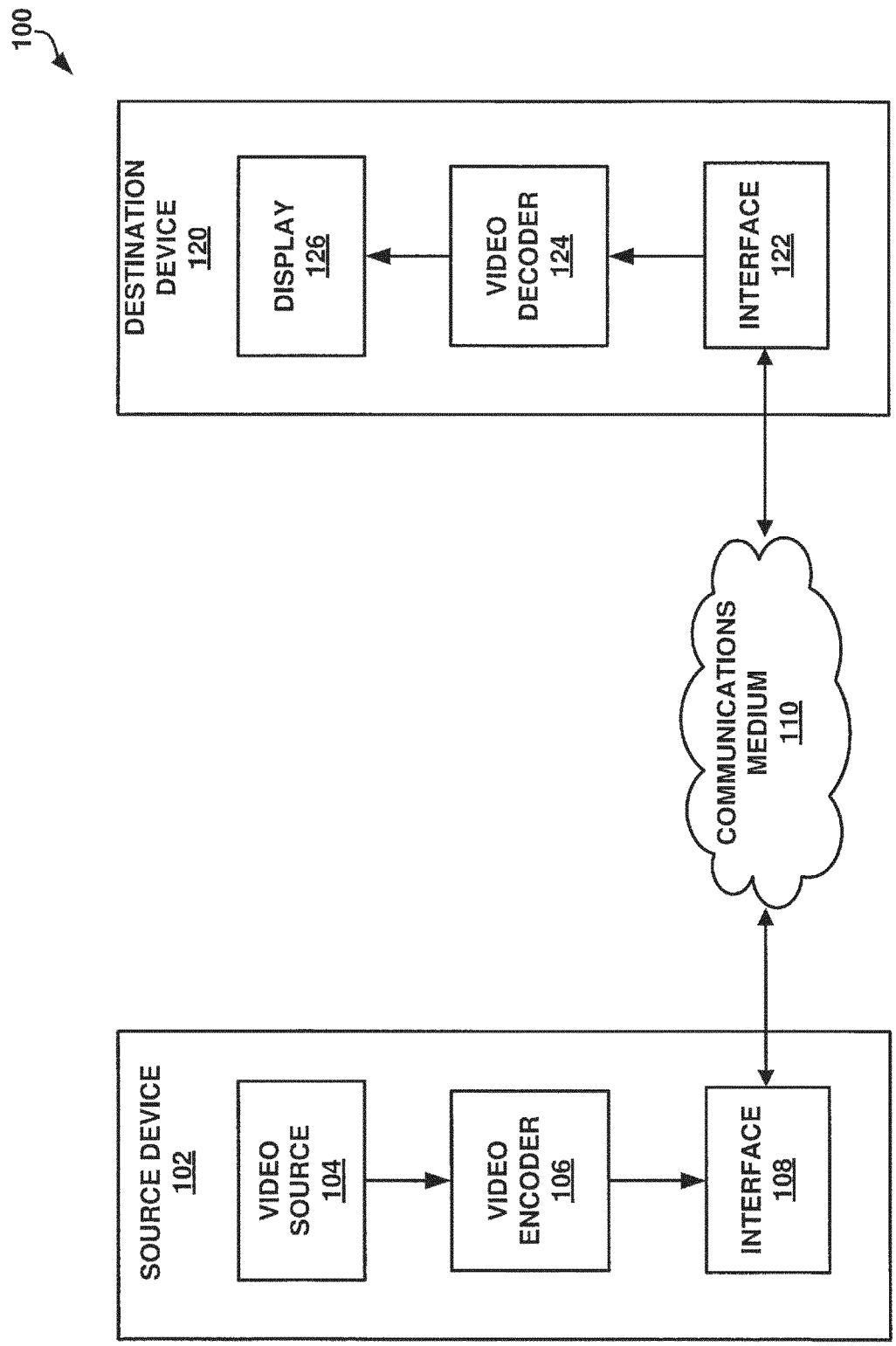
FIG. 5 is a block diagram illustrating an example of a system that may be configured to encode and decode video data according to one or more techniques of this disclosure.

FIG. 5 is a block diagram illustrating an example of a system that may be configured to code (i.e., encode and/or decode) video data according to one or more techniques of this disclosure. System 100 represents an example of a system that may perform video coding using intra prediction techniques described according to one or more examples of this disclosure. As illustrated in FIG. 5, system 100 includes source device 102, communications medium 110, and destination device 120. In the example illustrated in FIG. 5, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 5, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, I$^2$C, or any other logical and physical structure that may be used to interconnect peer devices.

Referring again to FIG. 5, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, I$^2$C, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 5, video decoder 124 is described as outputting data to display 126, video decoder 124 may be configured to output video data to various types of devices and/or sub-components thereof. For example, video decoder 124 may be configured to output video data to any communication medium, as described herein.

Figure 6:
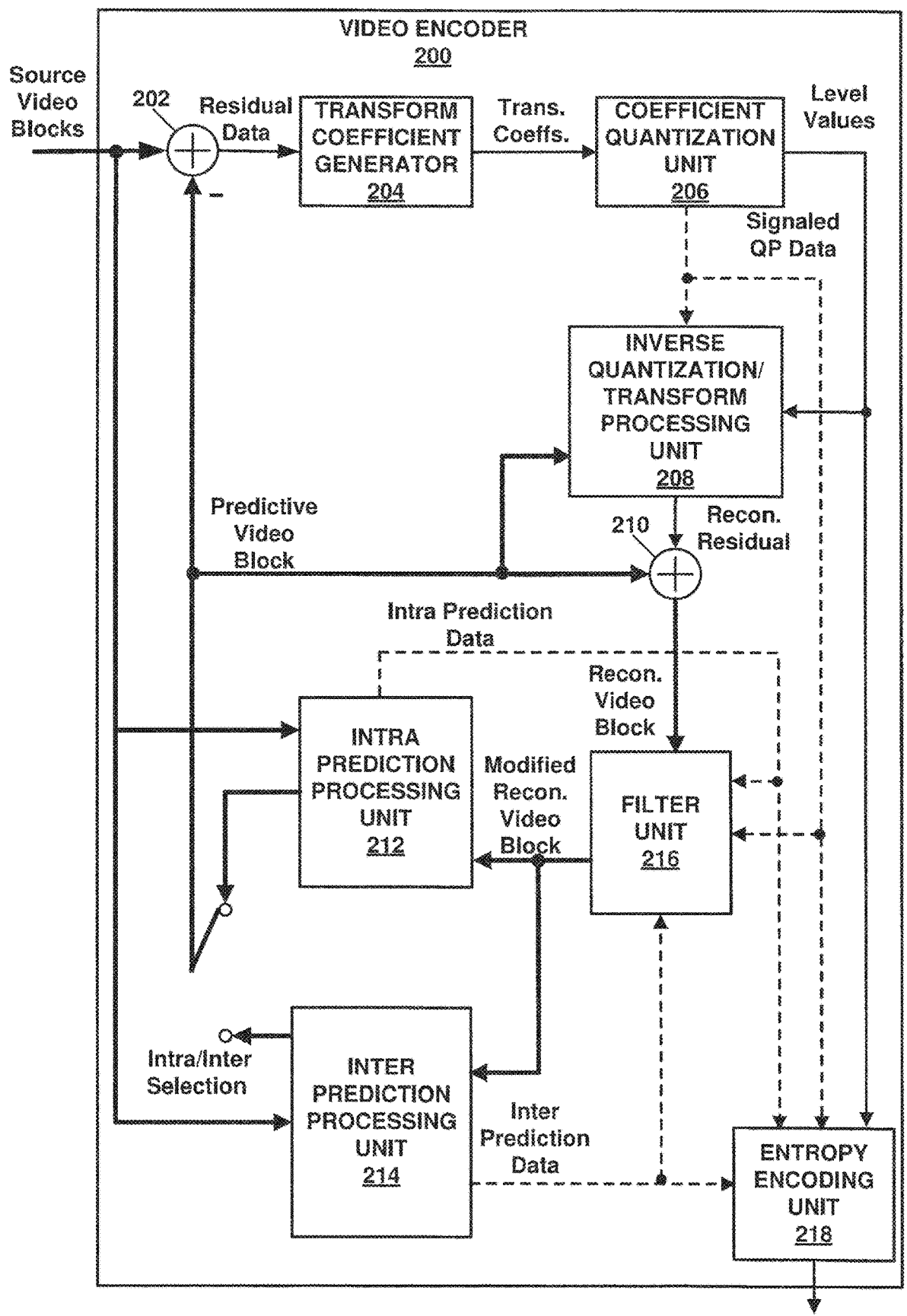
FIG. 6 is a block diagram illustrating an example of a video encoder that may be configured to encode video data according to one or more techniques of this disclosure.

FIG. 6 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 6, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 6, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 6, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206. Coefficient quantization unit 206 may be configured to perform quantization of the transform coefficients. As described above, the degree of quantization may be modified by adjusting a quantization parameter. Coefficient quantization unit 206 may be further configured to determine quantization parameters (QP) and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 6, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 6, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction mode. Intra prediction processing unit 212 may be configured to select an intra prediction mode for a current video block. Intra prediction processing unit 212 may be configured to evaluate a frame and/or an area thereof and determine an intra prediction mode to use to encode a current block. As illustrated in FIG. 6, intra prediction processing unit 212 outputs intra prediction data (e.g., syntax elements) to entropy encoding unit 218 and transform coefficient generator 204.

As described above, in JVET-M1001, non-MPM intra prediction modes are not enabled for NZRL and/or ISP intra prediction modes, which may be less than ideal. According to the techniques herein intra prediction processing unit 212 may be configured to use non-MPM intra prediction modes for NZRL and/or ISP prediction modes. In one example, intra prediction processing unit 212 may be configured to perform intra prediction according to the example syntax illustrated in Table 8. Similar to Table 1, above, Table 8 illustrates the revelation portion of the coding unit syntax for intra prediction.

TABLE 8

| coding_unit( x0, y0, cbWidth, cbHeight, treeType ) { | Descriptor |
|---|---|
| if( tile_group_type != I | | sps_ibc_enabled_flag ) { | |
|   if( treeType != DUAL_TREE_CHROMA ) | |
|     cu_skip_flag[ x0 ][ y0 ] | ae(v) |
|   if( cu_skip_flag[ x0 ][ y0 ] = = 0 && tile_group_type != I ) | |
|     pred_mode_flag | ae(v) |
|   if( ( ( tile_group_type = = I && cu_skip_flag[ x0 ][ y0 ] = =0 ) | | ( tile_group_type != I && CuPredMode[ x0 ][ y0 ] != MODE_INTRA ) ) && sps_ibc_enabled_flag ) | |
|     pred_mode_ibc_flag | ae(v) |
| } | |
| if( CuPredMode[ x0 ][ y0 ] = = MODE_INTRA ) { | |
| ... | |
| } else { | |
|   if( treeType = = SINGLE_TREE | | treeType = = DUAL_TREE_LUMA ) { | |
|     if( ( y0 % CtbSizeY ) > 0 ) | |
|       intra_luma_ref_idx[ x0 ][ y0 ] | ae(v) |
|     if (intra_luma_ref_idx[ x0 ][ y0 ] = = 0 && ( cbWidth <= MaxTbSizeY | | cbHeight <= MaxTbSizeY ) && ( cbWidth * cbHeight > MinTbSizeY * MinTbSizeY )) | |

TABLE 8-continued

```
coding_unit( x0, y0, cbWidth, cbHeight, treeType ) {         Descriptor intra_subpartitions_mode_flag[ x0 ][ y0 ]              ae(v)
        if( intra_subpartitions_mode_flag[ x0 ][ y0 ] = = 1 &&
            cbWidth <= MaxTbSizeY && cbHeight <=
            MaxTbSizeY )
          intra_subpartitions_split_flag[ x0 ][ y0 ]           ae(v)
        intra_luma_mpm_flag[ x0 ][ y0 ]                        ae(v)
        if( intra_luma_mpm_flag[ x0 ][ y0 ] )
          intra_luma_mpm_idx[ x0 ][ y0 ]                       ae(v)
        else
          intra_luma_mpm_remainder[ x0 ][ y0 ]                 ae(v)
      }
      if( treeType = = SINGLE_TREE | | treeType = =
DUAL_TREE_CHROMA )
        intra_chroma_pred_mode[ x0 ][ y0 ]                     ae(v)
      }
    } else if( treeType != DUAL_TREE_CHROMA ) { /*
MODE_INTER or MODE_IBC */
...
}
```

With respect to Table 8, for syntax elements cu_skip_flag, pred_mode_flag, pred_mode_ibc_flag, intra_luma_ref_idx, intra_subpartitions_mode_flag, intra_subpartitions_split_flag, and intra_chroma_pred_mode that semantics may be the same as those provided above with respect to Table 1. For syntax elements intra_luma_mpm_flag, intra_luma_mpm_idx, and intra_luma_mpm_remainder, the semantics may be as follows:

The syntax elements intra_luma_mpm_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit as provided above [with respect to Table 1].

Alternatively, the inference rule above may be modified to:
When intra_luma_mpm_flag[x0][y0] is not present, it is inferred to be equal to 0.

In one example, according to the techniques herein, for example, with respect to the syntax in Table 8, INTRA_PLANAR and INTRA_DC may be disallowed for NZRL. For example, using the following bitstream conformance constraint:
It is a requirement of bitstream conformance that, when IntraLumaRefLineIdx[x][y] is not equal to 0, IntraPredModeY[x][y] shall not be equal to INTRA_PLANAR or INTRA_DC.

It should be noted that in cases where INTRA_DC and INTRA_PLANAR are disallowed, such as the above case, (or IntraLumaRefLineIdx[x][y] is not equal to 0), the binarization of intra_luma_mpm_remainder may use a truncated binary (TB) binarization process with cMax=NUM_LUMA_MODE (67)−NUM_MOST_PROBABLE_MODES (6)−3=58.

In one example, according to the techniques herein, for example, with respect to the syntax in Table 8, INTRA_DC may be disallowed for ISP. For example, using, for example, the following bitstream conformance constraint:
It is a requirement of bitstream conformance that, when intra_subpartitions_mode_flag[x][y] is not equal to 0, IntraPredModeY[x][y] shall not be equal to INTRA_DC.

It should be noted that in cases where INTRA_DC is disallowed, such as the above case, (or when intra_subpartitions_mode_flag[x][y] is not equal to 0), the binarization of intra_luma_mpm_remainder may use a truncated binary (TB) binarization process with cMax=NUM_LUMA_MODE (67)−NUM_MOST_PROBABLE_MODES (6)−2=59.

Further it should be noted that a luma intra mode derivation process may change by skipping index increments when one of the disallowed mode is encountered.

In one example, according to the techniques herein, intra prediction processing unit 212 may be configured to use the planar prediction mode for NZRL. For example, with respect to the syntax in Table 8, intra prediction processing unit 212 may be configured to perform the following specification of the INTRA_PLANAR intra prediction mode:

Inputs to this process are:
 a variable nTbW specifying the transform block width,
 a variable nTbH specifying the transform block height,
 the neighbouring samples p[x][y], with x=−1−refIdx, y=−1−refIdx . . . refH−1 and x=−refIdx . . . refW−1, y=−1−refIdx,
 a variable refIdx specifying the intra prediction reference line index.

Outputs of this process are the predicted samples predSamples[x][y], with x=0 . . . nTbW−1, y=0 . . . nTbH−1.

The variables nW and nH are derived as follows:
 nW=Max(nTbW, 2)
 nH=Max(nTbH, 2)

The values of the prediction samples predSamples[x][y], with x=0 . . . nTbW−1 and y=0 . . . nTbH−1, are derived as follows:
 predV[x][y]=((nH−1−y)*p[x][−1−refIdx]+(y+1)*p[−1−refIdx]][nTb H])<<Log 2 (nW)
 predH[x][y]=((nW−1−x)*p[−1−refIdx]][y]+(x+1)*p[nTbW][−1−refId x])<<Log 2 (nH)
 predSamples[x][y]=(predV[x][y]+predH[x][y]+nW*nH)>>(Log 2 (nW)+Log 2 (nH)+1)

In one example, according to the techniques herein, intra prediction processing unit 212 may be configured to use the DC prediction mode for NZRL. For example, with respect to the syntax in Table 8, intra prediction processing unit 212 may be configured to perform the following specification of the INTRA_DC intra prediction mode:

Inputs to this process are:
 a variable nTbW specifying the transform block width,
 a variable nTbH specifying the transform block height,
 the neighbouring samples p[x][y], with x=−1−refIdx, y=−1−refIdx . . . refH−1 and x=−refIdx . . . refW−1, y=−1−refIdx,
 a variable refIdx specifying the intra prediction reference line index.

Outputs of this process are the predicted samples predSamples[x][y], with x=0 . . . nTbW−1, y=0 . . . nTbH−1.

The values of the prediction samples predSamples[x][y], with x=0 . . . nTbW−1, y=0 . . . nTbH−1, are derived by the following ordered steps:

3. A variable dcVal is derived as follows:
 When nTbW is equal to nTbH:

$$dcVal=(\Sigma_{x'=0}^{nTbw-1}p[x'][-1-\text{refIdx}]+\Sigma_{y'=0}^{nTbH-1}p[-1-\text{refIdx}][y']+nTbW)>>(\text{Log }2(nTbW)+1)$$

When nTbW is greater than nTbH:

$$dcVal=(\Sigma_{x'=0}^{nTbW-1}p[-1-\text{refIdx}]+(nTbW>>1))>>\text{Log }2(nTbW)$$

When nTbW is less than nTbH:

$$dcVal = (\Sigma_{y'=0}^{nTbH-1} p[-1-refIdx][y'] \\ (nTbH>>1)) >> Log\ 2(nTbH)$$

4. The prediction samples predSamplesbd[y] are derived as follows:
predSamples[x][y]=dcVal, with x=0 . . . nTbW−1, y=0 . . . nTbH−1

As described above, JVET-M1001 provides where a position-dependent intra prediction sample filtering process for modifying predicted samples is conditionally invoked. In one example, according to the techniques herein, a position-dependent intra prediction sample filtering process as follows. That is, intra prediction processing unit 212 may be configured such a position-dependent intra prediction sample filtering process is enabled for NZRL and/or ISP intra prediction modes:

When all of the following conditions are true, the position-dependent prediction sample filtering process specified above is invoked with the intra prediction mode predModeIntra, the transform block width nTbW, the transform block height nTbH, the predicted samples predSamples[x][y], with x=0 . . . nTbW−1, y=0 . . . nTbH−1, the reference sample width refW, the reference sample height refH, the reference samples p[x][y], with x=−1, y=−1 . . . refH−1 and x=0 . . . refW−1, y=−1, and the colour component index cIdx as inputs, and the output is the modified predicted sample array predSamples:
  cIdx is not equal to 0
  One of the following conditions is true:
    predModeIntra is equal to INTRA_PLANAR
    predModeIntra is equal to INTRA_DC
    predModeIntra is equal to INTRA_ANGULAR18
    predModeIntra is equal to INTRA_ANGULAR50
    predModeIntra is less than or equal to INTRA_ANGULAR10
    predModeIntra is greater than or equal to INTRA_ANGULAR58

As described above, in JVET-M1001, according to the transform process described above, a type of transform may be dependent on an intra prediction mode. In one example, according to the techniques herein, intra prediction processing unit 212 may be configured transform type may be selected for DC mode when ISP is used for a block. In particular, intra prediction processing unit 212 may be configured to perform the transform process described above where Table 6, above is replaced with Table 9, below.

TABLE 9

| predModeIntra | trTypeHor | trTypeVer |
|---|---|---|
| INTRA_PLANAR, INTRA_ANGULAR31, INTRA_ANGULAR32, INTRA_ANGULAR34, INTRA_ANGULAR36, INTRA_ANGULAR37 | ( nTbW >= 4 && nTbW <= 16 ) ? 1 : 0 | ( nTbH >= 4 && nTbH <= 16 ) ? 1 : 0 |
| INTRA_ANGULAR33, INTRA_ANGULAR35 INTRA_DC | 0 | 0 |
| INTRA_ANGULAR2, INTRA_ANGULAR4, . . . , INTRA_ANGULAR28, INTRA_ANGULAR30, INTRA_ANGULAR39, INTRA_ANGULAR41, . . . , INTRA_ANGULAR63, INTRA_ANGULAR65 | ( nTbW >= 4 && nTbW <= 16 ) ? 1 : 0 | 0 |
| INTRA_ANGULAR3, INTRA_ANGULAR5, . . . , INTRA_ANGULAR27, INTRA_ANGULAR29, INTRA_ANGULAR38, INTRA_ANGULAR40, . . . , INTRA_ANGULAR64, INTRA_ANGULAR66 | 0 | ( nTbH >= 4 && nTbH <= 16 ) ? 1 : 0 |

As described above, JVET-M1001 provides the ctxInc entry for syntax element intra_luma_mpm_flag is 0, as illustrated in Table 7. In one example, according to the techniques herein the ctxInc entry for syntax element intra_luma_mpm_flag may be, as illustrated in Table 10.

TABLE 10

| Syntax element | binIdx 0 |
|---|---|
| intra_luma_mpm_flag[ ][ ] | (intra_subpartitions_mode_flag[][] ? 1: ( IntraLumaRefLineIdx[][] != 0 ) ? 2 : 0 ) |

In one example, according to the techniques herein, the ctxInc entry for syntax element intra_luma_mpm_flag may be, as illustrated in Table 11.

TABLE 11

| Syntax element | binIdx 0 |
|---|---|
| intra_luma_mpm_flag [ ][ ] | (intra_subpartitions_mode_flag[][] ? 1 : 0 ) |

In one example, according to the techniques herein, the ctxInc entry for syntax element intra_luma_mpm_flag may be, as illustrated in Table 12.

TABLE 12

| Syntax element | binIdx 0 |
|---|---|
| intra_luma_mpm_flag[ ][ ] | ( IntraLumaRefLineIdx[][] != 0 ) ? 2 : 0 ) |

In this manner, video encoder 200 may be configured to perform entropy encoding on syntax element intra_luma_mpm_flag according to a context derived according to the techniques herein, where a context may be derived for intra_luma_mpm_flag based on whether NZRL or ISP intra prediction is used. Further, in one example, a context may be derived for intra_luma_mpm_flag, additionally or alternatively, based on the ISP mode (i.e., horizontal split or vertical split).

Referring again to FIG. 6, inter prediction processing unit 214 may be configured to perform inter prediction coding for a current video block. Inter prediction processing unit 214 may be configured to receive source video blocks and calculate motion information for PUs of a video block. A motion vector may indicate the displacement of a PU (or similar coding structure) of a video block within a current video frame relative to a predictive block within a reference frame. Inter prediction coding may use one or more reference pictures. For example, inter prediction processing unit 214 may locate a predictive video block within a frame buffer (not shown in FIG. 6). It should be noted that inter prediction processing unit 214 may further be configured to apply one or more interpolation filters to a reconstructed residual block to calculate sub-integer pixel values for use in motion estimation. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. Inter prediction processing unit 214 may output motion prediction data for a calculated motion vector to entropy encoding unit 218.

Referring again to FIG. 6, as illustrated in FIG. 6, inter prediction processing unit 214 may receive reconstructed video block via filter unit 216, which may be part of an in-loop filtering process. Filter unit 216 may be configured to perform deblocking and/or Sample Adaptive Offset (SAO) filtering. Deblocking refers to the process of smoothing the boundaries of reconstructed video blocks (e.g., make boundaries less perceptible to a viewer). SAO filtering is a non-linear amplitude mapping that may be used to improve reconstruction by adding an offset to reconstructed video data. Entropy encoding unit 218 receives quantized transform coefficients and predictive syntax data (i.e., intra prediction data, motion prediction data, QP data, etc.). Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. In this manner, video encoder 200 represents an example of a device configured to select a non-zero reference line (NZRL) prediction or a intra sub partitions (ISP) intra prediction mode for coding a current video block; select a non-most probable mode (MPM) as an intra prediction mode for generating a prediction for the current video block; and signal values of syntax elements indicating the selected NZRL prediction or ISP intra prediction mode and the selected non-MPM intra prediction mode.

Figure 7:
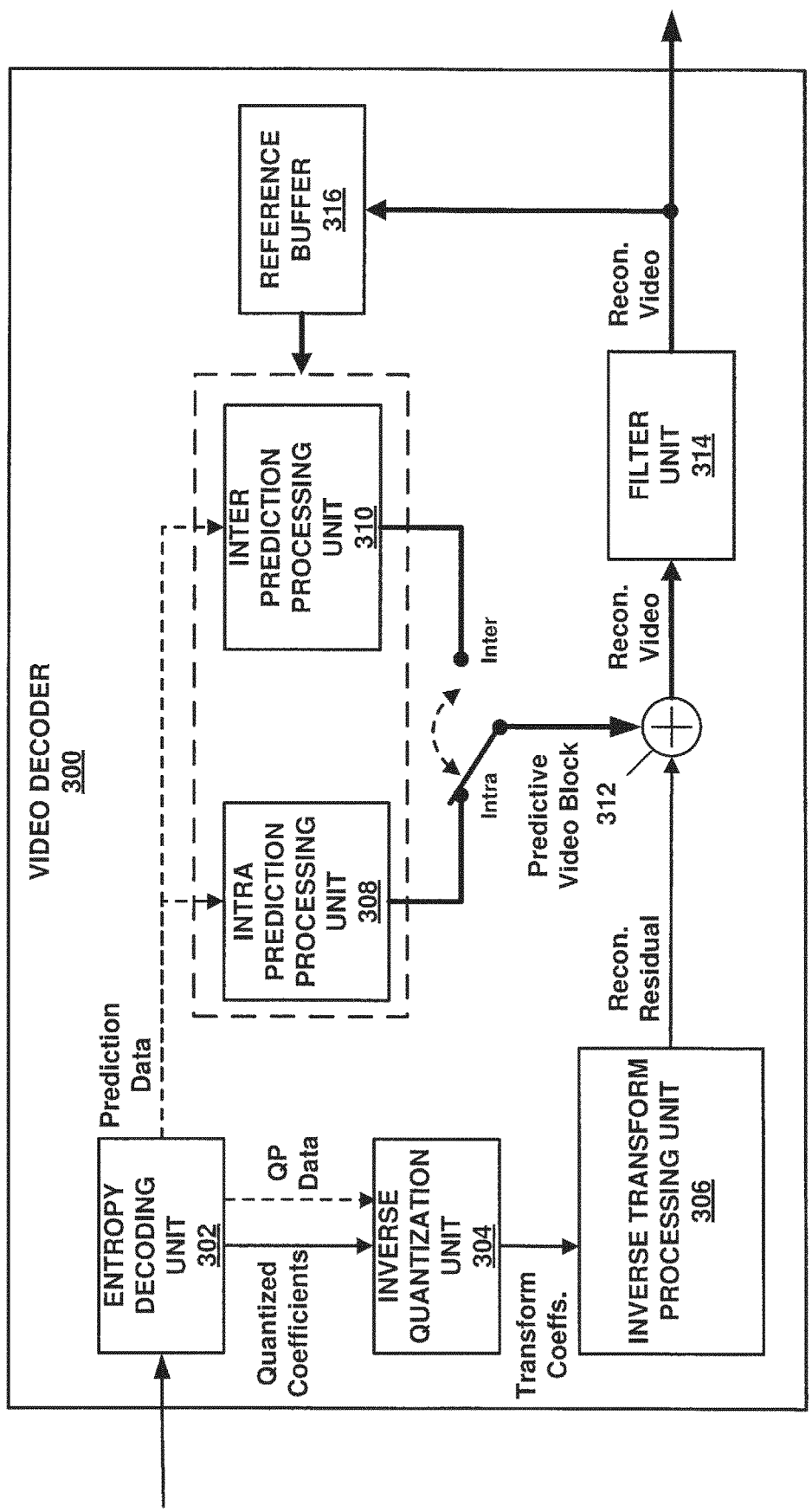
FIG. 7 is a block diagram illustrating an example of a video decoder that may be configured to decode video data according to one or more techniques of this disclosure.

FIG. 7 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 7 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 7, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. Inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 7, reconstructed residual data may be provided to summer 312. Summer 312 may add reconstructed residual data to a predictive video block and generate reconstructed video data.

As described above, a predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block.

As described above, video decoder 300 may parse an encoded bitstream where the encoded bitstream is generated based on the techniques described above and as described above, video encoder 200 may generate a bitstream according to the intra prediction techniques described above. Thus, video decoder 300 may be configured to perform intra prediction according to techniques described above. In this manner, video decoder 300 represents an example of a device configured to parse values of syntax elements to determine a non-zero reference line (NZRL) prediction or a intra sub partitions (ISP) intra prediction mode is used for coding a current video block and to determine a non-most probable mode (MPM) as a intra prediction mode used for generating a prediction for a current video block, and generate a prediction for a current video block based on the determined NZRL prediction or ISP intra prediction mode and the determined non-MPM intra prediction mode.

Referring again to FIG. 7, filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 7 a reconstructed video block may be output by video decoder 300.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of encoding video data, the method comprising: selecting a non-zero reference line (NZRL) prediction or a intra sub partitions (ISP) intra prediction mode for coding a current video block; selecting a non-most probable mode (MPM) as an intra prediction mode for generating a prediction for the current video block; and signaling values of syntax elements indicating the selected NZRL prediction or ISP intra prediction mode and the selected non-MPM intra prediction mode.

In one example, a method of decoding video data, the method comprising: parsing values of syntax elements to determine a non-zero reference line (NZRL) prediction or a intra sub partitions (ISP) intra prediction mode is used for coding a current video block and to determine a non-most probable mode (MPM) as a intra prediction mode used for generating a prediction for a current video block; and generating a prediction for a current video block based on the determined NZRL prediction or ISP intra prediction mode and the determined non-MPM intra prediction mode.

In one example, the method further comprising determining a transform for the current video block based on the intra prediction mode.

In one example, the method further comprising determining a context for a most probably mode flag based whether a non-zero reference line (NZRL) prediction or a intra sub partitions (ISP) intra prediction mode is used for coding the current video block.

In one example, the method further comprising performing a position dependent prediction sample filtering process.

In one example, a device for coding video data, the device comprising one or more processors configured to perform any and all combinations.

In one example, the device, wherein the device includes a video encoder.

In one example, the device, wherein the device includes a video decoder.

In one example, a system comprising: the device and the device.

In one example, an apparatus for coding video data, the apparatus comprising means for performing any and all combinations of the steps.

In one example, a non-transitory computer-readable storage medium comprising instructions stored thereon that, when executed, cause one or more processors of a device for coding video data to perform any and all combinations of the steps.

In one example, a method of decoding video data, the method comprising: parsing a first syntax element having a value indicating an intra sub partitions (ISP) intra prediction is used for coding a current video block; parsing a second syntax element indicating whether a most probable mode (MPM) or a non-most probable mode (MPM) is an intra prediction mode used for generating a prediction for the current video block according to the intra sub partitions (ISP) intra prediction; based on whether the second syntax element indicates a most probable mode (MPM) or a non-most probable mode (MPM) is an intra prediction mode used for generating a prediction, conditionally parsing one of: a third syntax element indicating a most probable mode (MPM), or a fourth syntax element indicating a non-most probable mode (MPM); and generating a prediction for the current video block based on the first syntax element.

In one example, the method further comprising performing a position dependent prediction sample filtering process on the generated prediction.

In one example, the method, wherein the first syntax is an intra sub partitions mode flag.

In one example, the method, wherein the second syntax is an intra luma most probable mode flag.

In one example, the method, wherein the third syntax is an intra luma most probable mode index.

In one example, the method, wherein the fourth syntax is an intra luma most probable mode remainder.

In one example, a device for coding video data, the device comprising one or more processors configured to: parse a first syntax element having a value indicating an intra sub partitions (ISP) intra prediction is used for coding a current video block; parse a second syntax element indicating whether a most probable mode (MPM) or a non-most probable mode (MPM) is an intra prediction mode used for generating a prediction for the current video block according to the intra sub partitions (ISP) intra prediction; and based on whether the second syntax element indicates a most probable mode (MPM) or a non-most probable mode (MPM) is an intra prediction mode used for generating a prediction, conditionally parse one of: a third syntax element indicating a most probable mode (MPM), or a fourth syntax element indicating a non-most probable mode (MPM;
generate a prediction for the current video block based on the ISP intra prediction.

In one example, the device further wherein the one or more processors are further configured to perform a position dependent prediction sample filtering process on the generated prediction.

In one example, the device, wherein the device includes a video decoder.

In one example, a method of encoding video data, the method comprising: selecting an intra sub partitions (ISP) intra prediction for coding a current video block; selecting a non-most probable mode (MPM) as an intra prediction mode for generating a prediction for the current video block for the current video block according to the intra sub partitions (ISP) intra prediction; signaling a value for a first syntax element having a value indicating an intra sub partitions (ISP) intra prediction is used for coding the current video block; and signaling a value for a second syntax element indicating a non-most probable mode (MPM) is an intra prediction mode used for generating a prediction for the current video block according to the intra sub partitions (ISP) intra prediction.

In one example, the method, wherein the first syntax is an intra sub partitions mode flag.

In one example, the method, wherein the second syntax is an intra luma most probable mode flag.

CROSS REFERENCE

This Nonprovisional application claims priority under 35 U.S.C. § 119 on provisional Application No. 62/817,454 on Mar. 12, 2019, the entire contents of which are hereby incorporated by reference.

The invention claimed is:

1. A method of decoding video data, the method comprising:
parsing a first syntax element specifying an intra prediction reference line index, wherein the first syntax element is an intra luma reference index syntax element having a value of one of 0, 1, and 2, wherein each of the values of 0, 1, and 2 specifies a distinct reference line index to generate reference samples;
parsing a second syntax element, only in a case that a value of the first syntax element is equal to 0, wherein the second syntax element specifies whether a current intra coding unit is partitioned into transform block sub partitions, and the second syntax element is an intra sub partitions mode flag;
parsing a third syntax element indicating a fourth syntax element is parsed or a fifth syntax element is parsed;
parsing one of the fourth syntax element and the fifth syntax element based on a value of the third syntax element;
deriving a variable specifying the intra prediction reference line index by using the first syntax element; and generating predicted samples for a current transform block based on one of the fourth syntax element and the fifth syntax element, wherein in a case that an intra prediction mode indicates an INTRA_DC intra prediction mode, the predicted samples are derived based on a neighboring left sample defined by the variable and a neighboring above sample defined by the variable, in a case that a transform block width is equal to a transform block height;

the predicted samples are derived based on only neighboring above samples defined by the variable, in a case that the transform block width is greater than the transform block height; and the predicted samples are derived based on only neighboring left samples defined by the variable, in a case that the transform block width is less than the transform block height.

2. A device for decoding video data, the device comprising one or more processors configured to:

parse a first syntax element specifying an intra prediction reference line index, wherein the first syntax element is an intra luma reference index syntax element having a value of one of 0, 1, and 2, wherein each of the values of 0, 1, and 2 specifies a distinct reference line index to generate reference samples;

parse a second syntax element, only in a case that a value of the first syntax element is equal to 0, wherein the second syntax element specifies whether a current intra coding unit is partitioned into transform block sub partitions, and the second syntax element is an intra sub partitions mode flag;

parse a third syntax element indicating a fourth syntax element is parsed or a fifth syntax element is parsed;

parse one of the fourth syntax element and the fifth syntax element based on a value of the third syntax element;

derive a variable specifying the intra prediction reference line index by using the first syntax element; and generate predicted samples for a current transform block based on one of the fourth syntax element and the fifth syntax element, wherein in a case that an intra prediction mode indicates an INTRA_DC intra prediction mode, the predicted samples are derived based on a neighboring left sample defined by the variable and a neighboring above sample defined by the variable, in a case that a transform block width is equal to a transform block height;

the predicted samples are derived based on only neighboring above samples defined by the variable, in a case that the transform block width is greater than the transform block height; and the predicted samples are derived based on only neighboring left samples defined by the variable, in a case that the transform block width is less than the transform block height.

3. The device of claim 2, wherein the device includes a video decoder.

4. A device for encoding video data, the device comprising one or more processors configured to:

parse a first syntax element specifying an intra prediction reference line index, wherein the first syntax element is an intra luma reference index syntax element having a value of one of 0, 1, and 2, wherein each of the values of 0, 1, and 2 specifies a distinct reference line index to generate reference samples;

parse a second syntax element, only in a case that a value of the first syntax element is equal to 0, wherein the second syntax element specifies whether a current intra coding unit is partitioned into transform block sub partitions, and the second syntax element is an intra sub partitions mode flag;

parse a third syntax element indicating a fourth syntax element is parsed or a fifth syntax element is parsed;

parse one of the fourth syntax element and the fifth syntax element based on a value of the third syntax element;

derive a variable specifying the intra prediction reference line index by using the first syntax element; and generate predicted samples for a current transform block based on one of the fourth syntax element and the fifth syntax element, wherein in a case that an intra prediction mode indicates an INTRA_DC intra prediction mode, the predicted samples are derived based on a neighboring left sample defined by the variable and a neighboring above sample defined by the variable, in a case that a transform block width is equal to a transform block height;

the predicted samples are derived based on only neighboring above samples defined by the variable, in a case that the transform block width is greater than the transform block height; and the predicted samples are derived based on only neighboring left samples defined by the variable, in a case that the transform block width is less than the transform block height.

5. The device of claim 2, wherein the third syntax element is an intra luma most probable mode flag.

6. The device of claim 2, wherein the fourth syntax element is an intra luma most probable mode index.

7. The device of claim 2, wherein the fifth syntax element is an intra luma most probable mode remainder.

* * * * *